United States Patent
Carruthers

(10) Patent No.: US 10,954,913 B2
(45) Date of Patent: Mar. 23, 2021

(54) WATERWHEEL

(71) Applicant: Penelope Jane Carruthers, Perth (GB)

(72) Inventor: Penelope Jane Carruthers, Perth (GB)

(*) Notice: Subject to any disclaimer, the term of this patent is extended or adjusted under 35 U.S.C. 154(b) by 0 days.

(21) Appl. No.: 16/311,565

(22) PCT Filed: Jun. 20, 2017

(86) PCT No.: PCT/GB2017/051801
§ 371 (c)(1),
(2) Date: Dec. 19, 2018

(87) PCT Pub. No.: WO2017/220995
PCT Pub. Date: Dec. 28, 2017

(65) Prior Publication Data
US 2019/0186457 A1    Jun. 20, 2019

(30) Foreign Application Priority Data
Jun. 20, 2016 (GB) .................... 1610730

(51) Int. Cl.
*F03B 7/00* (2006.01)
*F03B 17/06* (2006.01)

(52) U.S. Cl.
CPC .............. *F03B 7/00* (2013.01); *F03B 17/063* (2013.01); *Y02E 10/20* (2013.01)

(58) Field of Classification Search
CPC ......... F03B 7/00; F03B 17/063; Y02E 10/223
See application file for complete search history.

(56) References Cited

U.S. PATENT DOCUMENTS

| | | | | |
|---|---|---|---|---|
| 6,206,630 | B1* | 3/2001 | Feltenberger | F03B 7/003 290/54 |
| 2011/0299988 | A1* | 12/2011 | Riegerbauer | F03B 7/00 416/178 |

FOREIGN PATENT DOCUMENTS

| | | |
|---|---|---|
| CA | 1202545 A | 4/1986 |
| EP | 2821129 A1 | 1/2015 |

(Continued)

OTHER PUBLICATIONS

Müller, Gerald, "Renewable Energy—Muller Water Wheels as a Power Source," May 25, 2016, https://web.archive.org/web/20160525121029if_/http://hmf.enseeiht.fr/travaux//CDO708/beiere/3/html/bi/3/fichiers/Muller_histo.pdf.

(Continued)

*Primary Examiner* — Tulsidas C Patel
*Assistant Examiner* — Joseph Ortega
(74) *Attorney, Agent, or Firm* — Snell & Wilmer L.L.P.; Kent A. Lembke

(57) ABSTRACT

A breastshot waterwheel is configured to extract energy from an incoming water flow. The waterwheel is rotatable about an axis and comprises a plurality of paddles, each of the said paddles being in communication with the incoming water flow for a respective water receiving portion of a rotation cycle of the waterwheel about the axis. During the water receiving portion of the rotation cycle for a said paddle, the incoming water flow flows onto a water receiving surface of the paddle. The water receiving surface extends between first and second ends of the paddle. The first end is upstream of the second end and is configured such that, during at least a portion of said water receiving portion of the rotation cycle for said paddle, the incoming water flow flows in a substantially horizontal direction across said first end of the paddle onto an upstream portion of the water receiving surface. At least a portion of the incoming water flow received by the upstream portion of the water receiving surface flows from the upstream portion onto a downstream portion of said water receiving surface, thereby changing direction and exerting a force on the paddle causing the waterwheel to rotate about the said axis in a rotational direction. The waterwheel is configured to rotate about said axis in said rotational direction such that a magnitude of a tangential velocity of the first end of the said (Continued)

paddle is less than a speed of the incoming water flow flowing across the said first end of the paddle during the water receiving portion of the rotation cycle for the said paddle.

21 Claims, 10 Drawing Sheets

(56) References Cited

FOREIGN PATENT DOCUMENTS

| JP | 2005090318 A | 4/2005 |
|---|---|---|
| WO | 2010130901 A2 | 11/2010 |

OTHER PUBLICATIONS

International Search Report for International Application No. PCT/GB2017/051801.
Quaranta, et al, "Efficiency of Traditional Water Wheels," IAHR 2015, E-Proceedngs of the 36th IAHR World Congress, Jun. 2015.
Mackie, "An Advanced Breast-Shot Water Wheel: Assessment of Energy Output and Environmental Impact: Dean Village Case Study," MSc Energy, Water and Environmental Management, 2015.
Bassett, "Thesis: A Historical Survey of Low-Head Hydropower Generators and Recent Laboratory Based Work at the University of Salford," Apr. 1989.
Müeller, et al, "Stream Wheels for Applications in Shallow and Deep Water".
Müeller, et al, "The Breastshot Waterwheel: Design and Model Tests," Proceedings of the Institution of Civil Engineers, Engineering Sustainability I57, 2004, Issue ES, pp. 1-9.
Fairbairn, "On Water-Wheels With Ventilated Buckets," Feb. 6, 1849.
Müeller, "Water Wheels as a Power Source," Renewable Energy-Muller.
Bozhinova, et al, "Hydropower Converters With Head Differences Below 2-5 m," ICE Proceedings, 2011.
Carruthers, et al, "Reinventing the Wheel".
Church, The Alleged "Remarkable Error in the Theory of the Turbine Water Wheel," Theory of the Turbine Water Wheel, May 1884.
Denny, "The Efficiency of Overshot and Undershot Waterwheels," Institute of Physics Publishing, European Journal of Physics, 25 (2004) 193-202.
Gordon, "Remarks on Machines Recipient of Water Power," Institution of Civil Engineers—Session of 1842.
Grabbe, "Design of an Experimental Setup for Hydro-Kinetic Energy Conversion," Hydropower & Dams, Issue Five, 2009.
Quaranta, et al, "Performance Characteristics, Power Losses and Mechanical Power Estimation for a Breastshot Water Wheel," Energy, Sep. 28, 2015.
Williamson, et al, "Low Head Pico Hydro Turbine Selection Using a Multi-Criteria Analysis," World Renewable Energy Congress 2011-Sweden, Hydropower Applications (HP), May 8-13, 2011.
Carruthers, et al, "A New, More Efficient Waterwheel Design for Very-Low-Head Hydropower Schemes," Journal: Proceedings of the Institution of Civil Engineers-Civil Engineering, Research Article Paper 1700051, 2018.

\* cited by examiner

WATERWHEEL

FIELD OF THE INVENTION

The invention relates to waterwheels, waterwheel apparatus and methods for extracting energy from an incoming water flow.

BACKGROUND TO THE INVENTION

Waterwheels for extracting energy from a flow of water typically comprise paddles or buckets arranged around a circumference of a wheel fixed to an axle. Water flowing onto the paddles or buckets from a mill race (e.g. a channel), which may be a river or stream, causes the waterwheel, and thus the axle, to rotate. Waterwheels normally transfer power through the axle (although other methods of power transfer have also been used, for example some waterwheels transfer power via a cog wheel pressed into a toothed track around the circumference of the waterwheel) and were traditionally used to operate external mechanical machinery (such as for turning a millstone in a mill), while modern waterwheels can be used to generate electricity.

The most commonly-used variety of waterwheel is a vertical waterwheel, which is a waterwheel mounted on a horizontal axle and which rotates in a vertical plane. Traditional vertical waterwheels can be grouped into three broad types: undershot, overshot and breastshot.

An undershot waterwheel is configured such that water enters the waterwheel at a low height (near a bottom of the waterwheel) and leaves the waterwheel at an equally low or slightly lower height, the waterwheel being turned principally by the flow of water against the paddles (therefore extracting kinetic energy from the flow of water).

An overshot waterwheel is configured such that water enters the waterwheel near the top of the waterwheel and leaves at a lower height. A breastshot waterwheel is configured such that water enters the waterwheel at an intermediate height between the top and bottom of the waterwheel and leaves at a lower height. Both the overshot and breastshot waterwheels are turned principally by gravity acting on water caught in buckets or paddles of the waterwheel, and therefore both extract gravitational potential energy from the water due to a vertical 'head difference' between the point of entry of water onto the waterwheel and the point of exit. Breastshot waterwheels are traditionally considered to be less efficient than overshot wheels (but more efficient than undershot wheels), but are more suited to locations where the large head differences required by overshot wheels are not possible. Breastshot waterwheels of a given width (in a lateral dimension perpendicular to the plane in which the waterwheel rotates) are also more suited to larger volume flows of water than overshot waterwheels having the same width. It is generally believed that, in order to maximise the efficiency of a breastshot or overshot waterwheel, the flow speed of water entering the wheel should be minimised so as to avoid turbulent flow on the waterwheel paddles. In addition, it is believed that the flow speed of water entering the waterwheel should be same as the flow speed of water leaving the waterwheel.

The lower efficiency of waterwheels compared to other methods of electrical power generation has led to a decline in their use. However, waterwheels present an environmentally friendly way to generate renewable power from a natural resource. Waterwheels also pose a reduced risk to aquatic animals such as fish. It would therefore be beneficial to provide a more efficient waterwheel design suitable for modern power generation.

SUMMARY OF THE INVENTION

A first aspect of the invention provides a breastshot waterwheel configured to extract energy from an incoming water flow. The waterwheel is rotatable about an axis and comprises a plurality of paddles. Each of the said paddles is in communication with the incoming water flow for a respective water receiving portion of a rotation cycle of the waterwheel about the axis. During the water receiving portion of the rotation cycle for a said paddle (typically during the water receiving portion of the rotation cycle for each said paddle), the incoming water flow flows onto a water receiving surface of the paddle. The water receiving surface extends between first and second ends of the paddle. The first end is upstream of the second end and is configured such that, during at least a portion of said water receiving portion of the rotation cycle for said paddle (e.g. during the entire water receiving portion of the rotation cycle for said paddle), the incoming water flow flows in a substantially horizontal direction across said first end of the paddle onto an upstream portion of the water receiving surface. At least a portion of the incoming water flow received by the upstream portion of the water receiving surface flows (subsequently) from the upstream portion onto a downstream portion of said water receiving surface (of said paddle) (as the waterwheel rotates), thereby changing direction (such that momentum is transferred from the water to the water receiving surface) and exerting a force on the paddle causing the waterwheel to rotate about the said axis in a rotational direction. The waterwheel is configured to rotate about said axis in said rotational direction such that a magnitude of a tangential velocity of the first end of the said paddle (e.g. each paddle) is less than a speed of the incoming water flow flowing across the said first end of the paddle during the water receiving portion of the rotation cycle for the said paddle.

The waterwheel is configured to extract both gravitational potential energy and kinetic energy from the incoming water flow as the waterwheel rotates. The waterwheel of the present invention therefore typically extracts more energy from an incoming water flow than known breastshot waterwheels. In particular, while the waterwheel of the present invention typically extracts a similar amount of gravitational potential energy from the incoming water flow as is extracted by known, similarly-sized, breastshot waterwheels, the waterwheel of the present invention additionally extracts a greater amount of the kinetic energy of the incoming water flow than known, similarly-sized, breastshot waterwheels extract. Indeed, known breastshot waterwheels, or apparatus comprising said known waterwheels, are typically configured to reduce the speed of an incoming water flow in an attempt to reduce turbulence on the paddles in the belief that this will improve efficiency of energy extraction.

Gravitational potential energy is typically extracted from the incoming water flow as water travels through a vertical distance from a first height of water entry onto the waterwheel to a second height of water exit from the waterwheel as the waterwheel rotates (the first height typically being greater than the second height). The waterwheel is typically configured for use in locations where the local gravitational field is approximately constant (such as on or near the surface of the Earth) such that the gravitational potential energy extracted from the incoming water flow is proportional to the vertical height difference (vertical head difference) between said first and second heights. The waterwheel typically extracts gravitational potential energy from the incoming water flow because weight of water flowing onto, or flowing across, or resting on, each paddle exerts a force on said paddle (vertically downwards) due to gravity, typically causing the waterwheel to rotate about the axis in the rotational direction.

The incoming water flow possesses kinetic energy due to its (translational) motion in a principal flow direction. Kinetic energy is typically extracted from the incoming water flow as the at least a portion of the incoming water flow flows across the water receiving surface of each said paddle. In particular, kinetic energy is typically extracted from the incoming water flow as said at least a portion of the incoming water flow received by the upstream portion of the water receiving surface of each said paddle flows from the upstream portion onto the downstream portion of said water receiving surface and thereby changes direction. Because the water changes direction, the velocity (being a vector quantity) of the water changes and momentum is transferred from the water to the paddle, thereby exerting a force on the paddle and thus transferring energy to the waterwheel in the process.

The at least a portion of the incoming flow proceeds to flow across the water receiving surface of each paddle (from the upstream portion of the water receiving surface onto the downstream portion of the water receiving surface of each paddle) as the waterwheel rotates in part because the waterwheel is configured to rotate about the axis in the rotational direction such that the magnitude of the tangential velocity of the first end of the said paddle is less than the speed of the incoming water flow flowing onto the said paddle. Accordingly, by configuring the waterwheel to rotate slowly relative to the speed of the incoming water flow (i.e. by configuring the waterwheel to rotate such that the magnitude of the tangential velocity of the first end of the said paddle is less than the speed of the incoming water flow flowing onto the said paddle), extraction of greater amounts of kinetic energy from the incoming water flow is made possible.

Additionally, because the waterwheel is configured to rotate about the axis in the rotational direction such that the magnitude of the tangential velocity of the first end of the said paddle is less than the speed of the incoming water flow flowing onto the said paddle, water from the incoming water flow flowing across each paddle as the waterwheel rotates is typically slowed as the water travels from the point of water entry to the point of water exit. The water therefore typically exits the waterwheel at a slower speed than the initial speed of the incoming water flow on entry to the waterwheel. Accordingly, water typically exits the waterwheel with less kinetic energy than it possesses on entering the waterwheel, because kinetic energy is transferred to the waterwheel.

Moreover, because the incoming water flow flows in a substantially horizontal direction across the first end of the paddle onto the upstream portion of the water receiving surface as it flows onto the paddle, a substantial portion (e.g. the majority) of the kinetic energy of the incoming water flow is preserved as it flows (initially) onto the paddle (i.e. kinetic energy is not substantially wasted (through, e.g. excessive turbulence or changes in the flow direction) as water flows onto the paddle), such that a significant quantity of kinetic energy is available for extraction by the waterwheel while the water passes through the waterwheel as it rotates. Configuring the first end of each paddle such that the incoming water flow flows in a substantially horizontal direction across said first end of the paddle onto the upstream portion of the water receiving surface of the paddle therefore results in a more efficient waterwheel which can extract more kinetic energy than waterwheels in which water is significantly deflected (away from the horizontal) as it flows onto each paddle. The waterwheel is therefore particularly suited for extracting energy from substantially horizontal incoming water flows.

The proportion of the kinetic energy of the incoming water flow which it is typically possible for the waterwheel to extract is limited in part by the magnitude of the tangential velocity of the first end of each paddle as the waterwheel rotates. Water exiting the waterwheel (if said waterwheel is at least partially submerged in water) typically exits with a speed equal to or greater than the magnitude of the tangential velocity of the first end of each paddle, otherwise exiting water exerts a back pressure on the waterwheel paddles (thereby wasting energy). The amount of kinetic energy extracted by the waterwheel is therefore typically dependent on the difference between the speed of the incoming water flow (at the point of water entry onto the waterwheel) and the speed of water exiting the waterwheel (i.e. approximately the magnitude of the tangential velocity of the first end of each paddle). Therefore, for a given tangential velocity of the first end of each paddle, the amount of kinetic energy extracted by the waterwheel typically increases as the speed of the incoming water flow increases. The waterwheel of the present invention is therefore typically suited for use with fast-flowing incoming water flows (such as incoming water flows derived from fast-flowing rivers). This contrasts with known breastshot waterwheels which are typically configured for use with slowly flowing incoming water flows.

It will be understood that, throughout this specification and the appended claims, the term 'horizontal' is defined with reference to a horizontal plane perpendicular to the direction in which (the force due to) gravity acts (i.e. perpendicular to the gradient of the local gravitational field in the vicinity of the waterwheel). The gravitational field of the Earth can typically be assumed to be uniform over distances on the same scale as the dimensions of the waterwheel such that said horizontal plane is well defined. Directions, lines or planes which are horizontal are directions, lines or planes lying in (or parallel to) said horizontal plane.

It will also be understood that, throughout this specification and the appended claims, the terms 'upstream' and 'downstream' refer to directions defined with reference to the direction of flow of the incoming water flow (and in particular the direction of flow of the incoming water flow from the point of water entry onto the waterwheel to the point of water exit from the waterwheel).

The principal flow direction of the incoming water flow typically has a substantial horizontal component (i.e. a substantial component in a horizontal direction). Accordingly, it may be that the principal flow direction of the incoming water flow is substantially horizontal. It may be that an (acute) angle between the principal flow direction of the incoming water flow and a horizontal plane is less than 20°, more typically less than 15°, more typically less than 10°, or even more typically less than 5°.

The speed of the incoming water flow flowing onto each paddle is typically the speed of the incoming water flow in the principal flow direction.

It may be that during at least a portion of the (e.g. a majority of the, for example the entire) water receiving portion of the rotation cycle for said paddle (or during at least a portion of the (e.g. a majority of the, for example the entire) water receiving portion of the rotation cycle for each said paddle), an (acute) angle between the principal flow direction of the incoming water flow and a tangent to the water receiving surface at the first end of said paddle, said tangent being in a plane of rotation of the waterwheel about said axis, is less than 35°, more typically less than 25°, or more typically less than 15°, or even more typically less than 5°. Accordingly, the direction of flow (and/or the velocity) of water in the incoming water flow does not change significantly as it flows (initially) onto said paddle. A significant proportion (preferably a majority) of the momentum of the water is maintained as it flows onto said paddle. A significant proportion (preferably a majority) of the kinetic energy of the incoming water flow flowing onto each said paddle is, therefore, initially preserved. The greater the proportion of the kinetic energy of the incoming water flow which is preserved as the water flows onto each said paddle, the greater the quantity of kinetic energy which can subsequently be transferred to each said paddle, and the greater the efficiency of the waterwheel.

It may be that, during at least a portion of the (e.g. a majority of the, for example the entire) water receiving portion of the rotation cycle for said paddle (or during at least a portion of the (e.g. a majority of the, for example the entire) water receiving portion of the rotation cycle for each said paddle), the water receiving surface at the first end of said paddle faces downstream (i.e. said water receiving surface at the first end of said paddle faces in a direction having a component which extends in a downstream direction, i.e. in the direction of the principal flow direction of the incoming water flow). Accordingly, it may be that, during the portion of the (e.g. the majority of the, for example the entire) water receiving portion of the rotation cycle for said paddle (or during the portion of the (e.g. the majority of the, for example the entire) water receiving portion of the rotation cycle for each said paddle), a normal to the water receiving surface at the first end of said paddle has a (positive) component in a downstream direction. It may be that, when the normal to the water receiving surface at the first end of said paddle has a (positive) component in the downstream direction (i.e. the normal points downstream), the (acute) angle between the principal flow direction of the incoming water flow and the tangent to the water receiving surface at the first end of said paddle, said tangent being in a plane of rotation of the waterwheel about said axis, is less than 10°, or more typically less than 5°. It will be understood that the normal to the water receiving surface is typically an outward-pointing normal vector (i.e. the normal points away from the water receiving surface). For example, it may be that the paddle comprises an underside surface opposite said water receiving surface and that said normal to the water receiving surface at the first end of said paddle does not intersect the underside surface of said paddle. The normal to the water receiving surface at the first end of said paddle typically extends perpendicular to the tangent to the water receiving surface at the first end of said paddle.

It may be that, during at least a portion of the (e.g. a majority of the, for example the entire) water receiving portion of the rotation cycle for said paddle (or during at least a portion of the (e.g. a majority of the, for example the entire) water receiving portion of the rotation cycle for each said paddle), the water receiving surface at the first end of said paddle faces upstream (i.e. said water receiving surface at the first end of said paddle faces in a direction having a component which extends in an upstream direction, i.e. opposite to the direction of the principal flow direction of the incoming water flow). Accordingly, it may be that, during the portion of the water receiving portion of the rotation cycle for said paddle (or during the portion of the water receiving portion of the rotation cycle for each said paddle), the normal to the water receiving surface at the first end of said paddle has a (positive) component in an upstream direction. It may be that, when the normal to the water receiving surface at the first end of said paddle has a positive component in the upstream direction (i.e. the normal points upstream), the (acute) angle between the principal flow direction of the incoming water flow and the tangent to the water receiving surface at the first end of said paddle, said tangent being in a plane of rotation of the waterwheel about said axis, is less than 35°, or more typically less than 25°, or more typically less than 15°, or even more typically less than 5°.

It may be that the tangent to the water receiving surface at the first end of said paddle is a tangent to the water receiving surface at a first edge of said water receiving surface at the first end of said paddle (said tangent also typically lying in the plane of rotation of the waterwheel). It may be that the normal to the water receiving surface at the first end of said paddle is a normal to the water receiving surface at said first edge of said water receiving surface at the first end of said paddle (said normal also typically lying in the plane of rotation of the waterwheel).

It may be that an (acute) angle between the tangent to the water receiving surface at the first end of said paddle and the horizontal (i.e. a horizontal plane) is less than 35°, or more typically less than 25°, or more typically less than 15°, or even more typically less than 5°, during at least a portion of the (e.g. a majority of the, for example the entire) water receiving portion of the rotation cycle for said paddle. Accordingly, it may be that the tangent to the water receiving surface at the first end of said paddle is (substantially) horizontal (i.e. lies (substantially) in the horizontal plane) during at least portion of the (e.g. a majority of the, for example the entire) water receiving portion of the rotation cycle for said paddle.

One rotation cycle of the waterwheel about its axis typically comprises one complete turn of the waterwheel about said axis. That is to say, one rotation cycle of the waterwheel about its axis typically comprises rotation of the waterwheel through 360° in the plane of rotation of the waterwheel perpendicular to its axis.

It may be that the paddles are arranged periodically around the axis about which the waterwheel is rotatable. For example, the paddles may be arranged such that the water receiving surface of each paddle typically faces (at least partially) (vertically) upwards during the water receiving portion of the rotation cycle for said paddle. It may be that each paddle comprises an underside surface opposite its water receiving surface. It may be that the paddles are arranged such that the water receiving surface of each of the said paddles faces the underside surface of another of the said paddles.

It may be that said paddles are fixedly arranged around the axis. Accordingly, it may be that rotation of the waterwheel about the axis comprises rotation (e.g. rigid rotation) of the plurality of paddles with the waterwheel around the axis. Said paddles are typically arranged around said waterwheel such that rotation of the waterwheel about the axis brings each paddle sequentially in and out of communication with the incoming water flow.

It may be that the first ends of the said paddles are spaced equally apart from one another around the axis. This typically ensures that the waterwheel rotates at a constant rotational speed, during its rotational cycle, when water flows onto the waterwheel at a constant flow rate and when each paddle is substantially identical.

The upstream and downstream portions of the water receiving surface are typically configured such that water flowing from the upstream portion onto the downstream portion changes direction (thereby exerting a force on the paddle).

It may be that the relative orientation of the upstream and the downstream portions of the water receiving surface of said paddle is configured such that water flowing from the upstream portion onto the downstream portion changes direction (thereby exerting a force on the paddle).

It may be that an (obtuse) angle between (e.g. formed between or enclosed between) the upstream portion of the water receiving surface of said paddle and the downstream portion of the water receiving surface of said paddle (e.g. an (obtuse) angle between a tangent to the upstream portion of the water receiving surface of said paddle and a tangent to the downstream portion of the water receiving surface of said paddle) is less than 160°, or more typically less than 150°, or more typically less than 140°, or more typically less than 130°, or more typically less than 120°, or more typically less than 110°, or even more typically less than 100°.

It may be that at least a portion of the water receiving surface of said paddle is (longitudinally) curved in said plane of rotation of the waterwheel about said axis.

It may be that at least a portion of the water receiving surface of said paddle is (longitudinally) curved (in said plane of rotation) such that the relative orientation of the upstream and the downstream portions of the water receiving surface of said paddle is configured such that water flowing from the upstream portion onto the downstream portion changes direction (thereby exerting a force on the paddle).

It may be that at least a portion of the water receiving surface of said paddle is (longitudinally) curved such that the (obtuse) angle between the upstream portion of the water receiving surface of said paddle and the downstream portion of the water receiving surface of said paddle (e.g. the (obtuse) angle between a tangent to the upstream portion of the water receiving surface of said paddle and a tangent to the downstream portion of the water receiving surface of said paddle) is less than 160°, or more typically less than 150°, or more typically less than 140°, or more typically less than 130°, or more typically less than 120°, or more typically less than 110°, or even more typically less than 100°.

It may be that the water receiving surface of the paddle curves through an angle of between 10° and 110°, or more typically between 20° and 100°, or more typically between 30° and 90°, between the upstream portion and the downstream portion of said water receiving surface.

It may be that at least a portion of the water receiving surface of said paddle is (longitudinally) curved such that the curvature of the upstream portion of the water receiving surface of said paddle is different to the curvature of the downstream portion of the water receiving surface of said paddle.

It may be that the curvature of the upstream portion of the water receiving surface of said paddle is greater than the curvature of the downstream portion of the water receiving surface of said paddle.

It may be that the upstream portion of the water receiving surface of the paddle is (longitudinally) curved and the downstream portion of the water receiving surface of the paddle is not (longitudinally) curved.

It may be that the (longitudinal) curvature of the water receiving surface of the paddle varies between the upstream and downstream portions of said water receiving surface.

It may be that at least a portion of the water receiving surface of said paddle is concave. It may be that the entire water receiving surface of said paddle is concave. It may be that the paddle is concave. It may be that the (at least a portion of the) water receiving surface and/or the paddle is concave and faces (vertically) upwards during at least a portion of the water receiving portion of the rotation cycle for said paddle.

It may be that the at least a portion of the water receiving surface of each paddle which is curved comprises the first end of said paddle. Alternatively, it may be that the at least a portion of the water receiving surface of each paddle which is curved does not comprise the first end of said paddle. It may be that the at least a portion of the water receiving surface of each paddle which is curved comprises the second end of said paddle. Alternatively, it may be that the at least a portion of the water receiving surface of each paddle does not comprise the second end of said paddle. It may be that the at least a portion of the water receiving surface of each paddle which is curved is a portion of said water receiving surface intermediate the first and second ends. It may be that the at least a portion of the water receiving surface of each paddle which is curved is a portion of said water receiving surface from the first end to an intermediate portion between the first and second ends. It may be that the at least a portion of the water receiving surface of each paddle which is curved is a portion of said water receiving surface from the second end to an intermediate portion between the first and second ends. It may be that the at least a portion of the water receiving surface of each paddle comprises the entire water receiving surface of said paddle (e.g. from the first end to the second end).

It may be that the water receiving surface of each paddle, or a portion thereof, is longitudinally curved (that is to say, curved along a direction from the first end of said paddle towards the second end of said paddle in the plane of rotation).

It may be that the water receiving surface of said paddle is curved along a length of said paddle from the first end of said paddle to the second end of said paddle.

It may be that a longitudinal curvature of the water receiving surface of each paddle is constant along the length of said paddle from the first end to the second end. Alternatively, the longitudinal curvature of the water receiving surface of each paddle may vary along the length of said paddle from the first end to the second end. It may be that a portion or portions of the water receiving surface of each paddle are longitudinally flat (that is to say, they may have zero curvature along the direction from the first end of said paddle towards the second end of said paddle).

It may be that a (longitudinal) curvature of the water receiving surface of said paddle is greater towards the first end of said paddle than it is towards the second end of said paddle. It may be that the (longitudinal) curvature of the water receiving surface of said paddle (continuously) decreases along the longitudinal direction from the first end of the paddle towards the second end of the paddle.

The paddle is typically configured such that water flows substantially smoothly across the water receiving surface thereof. For example, it may be that the paddle is configured such that water maintains (predominantly) laminar flow (i.e. flows laminarly) as it flows across the water receiving surface thereof. Water therefore typically remains attached to the water receiving surface as it flows thereacross.

It may be that the water receiving surface of the paddle is configured (e.g. shaped) such that water flows substantially smoothly thereacross (e.g. between the upstream and downstream portions thereof). It may be that the water receiving surface of the paddle is configured (e.g. shaped) such that water maintains laminar flow (i.e. flows laminarly) as it flows thereacross (e.g. between the upstream and downstream portions thereof).

It may be that the paddle (and/or the water receiving surface of said paddle) is continuously curved such that water flows substantially smoothly and/or maintains laminar flow (i.e. flows laminarly) as it flows across the water receiving surface (e.g. between the upstream and downstream portions thereof). It may be that water flowing across said continuously curved water receiving surface maintains laminar flow for (substantially) longer than water flowing across a discontinuously curved water receiving surface or a water receiving surface comprising both curved and longitudinally flat portions or comprising connected non-parallel longitudinally flat portions.

Kinetic energy is typically transferred more efficiently from the water to the paddle (and thus the waterwheel) when water flows across the water receiving surface smoothly (i.e. when the water maintains laminar flow (flows laminarly) thereacross) (between the upstream and downstream portions). Kinetic energy is therefore typically not wasted through excessive turbulence (i.e. through turbulent flow) as water flows across the water receiving surface.

It may be that the water receiving surface of (each) said paddle is not curved in a lateral direction perpendicular to the direction of incoming water flow (and/or perpendicular to the plane of rotation of the waterwheel). Alternatively, said water receiving surface of (each) said paddle may be curved in said lateral direction. The lateral curvature of the water receiving surface may vary along the longitudinal length of the paddle from the first end to the second end.

It may be the shape and/or length of each paddle is configured such that at least 50%, or more typically at least 60%, or even more typically at least 70% of the volume of the incoming water flow flowing onto the paddle during the water receiving portion of the rotation for said paddle subsequently flows from the upstream portion onto the downstream and thereby changes direction.

It may be that the first end of (each) said paddle is positioned a distance r from the axis and that a longitudinal length of the water receiving surface of said paddle (for example a longitudinal length of said paddle along a direction from the first end of said paddle to the second end of said paddle) is between 0.5r and r. That is to say, the water receiving surface of (each) said paddle is typically substantially long relative to the external dimensions of the waterwheel. The water receiving surface of (each) said paddle is typically longer than the water receiving surface of the paddles of known, similarly sized, breastshot waterwheels. For example, a longitudinal length of the water receiving surface of (each) said paddle (e.g. a longitudinal length of (each) said paddle) is typically between 1 metre and 10 metres, or more typically between 2 metres and 7 metres.

It may be that the longitudinal length of the or each said paddle is at least 1 metre, or more typically at least 1.5 metres, or even more typically at least 2 metres, or even more typically at least 2.5 metres, or even more typically at least 3 metres. The longitudinal length of the or each said paddle is typically the length of the straight line distance between the first and second ends of the said paddle.

The (e.g. length of the) water receiving surface of (each) said paddle is typically configured (i.e. selected) such that at least a portion of the incoming water flow (which has flowed onto said paddle) flows downstream from the first end of the paddle towards the second end of the paddle and decelerates to a zero flow speed (relative to the water receiving surface of the paddle) before reaching the second end of the paddle. Water which has travelled up the paddle (in the downstream direction) therefore typically subsequently flows back down the paddle (in an upstream direction) towards the first end (due to (the force of) gravity acting on the water). Water which flows back down the paddle typically flows from the downstream portion of the water receiving surface onto the upstream portion of the water receiving surface and consequently changes direction, thereby exerting a further force on the paddle (again due to the change in momentum of the water). Additional kinetic energy is therefore transferred from the water to the paddle as the water flows back down the paddle. Paddles having sufficient length such that water (flowing across the water receiving surface) typically does not flow over the second end (and thereby escape the paddle), typically increase the efficiency of the waterwheel.

It may be that a paddle wall is provided at the second end of (each) said paddle, the paddle wall being configured to restrict (e.g. prevent) flow of water across the second end of the paddle in the downstream direction (i.e. to prevent water escaping from the paddle in the downstream direction). The paddle wall may extend from the water receiving surface of said paddle at the second end. The paddle wall may extend from the water receiving surface at the second end in a direction which is substantially perpendicular to the water receiving surface at the second end. It may be that the paddle wall extends between said paddle and (an underside of) another adjacent paddle. It may be that the paddle wall (at least partially) encloses a space between the water receiving surface of the paddle and (the underside of) the adjacent paddle (thereby forming a (at least partially enclosed) paddle cell).

However, it may also be that no such paddle wall is provided at the second end of (each) said paddle. It may be that a space between (e.g. a paddle cell between) the water receiving surface of the paddle and (the underside of) the adjacent paddle is open at the second end of the paddle, such that flow of water across the second end of the paddle in the downstream direction is not restricted (e.g. prevented). Water flowing sufficiently quickly may therefore escape from the paddle in the downstream direction. Accordingly, it may be that the length of the water receiving surface of the paddle is configured (i.e. selected) such that the incoming water flow which flows onto said paddle flows downstream from the first end of the paddle towards the second end of the paddle and decelerates to a zero flow speed before reaching the second end of the paddle, such that less than 20%, or more typically less than 10%, or even more typically less than 5%, of the at least a portion of the incoming water flow which flows from the upstream portion onto the downstream portion of said water receiving surface escapes from the paddle across the second end.

Additionally or alternatively, the orientation of the water receiving surface of the or each said paddle may be configured (i.e. selected) such that at least a portion (for example at least 50%, or more typically at least 70%) of the incoming water flow (which has flown onto said paddle) flows downstream from the first end of the paddle towards the second end of the paddle and decelerates to a zero flow speed before reaching the second end of the paddle.

The length and/or orientation of the water receiving surface of each paddle may be selected based on the known and/or expected speed of the incoming water flow. The faster the incoming water flow, the longer and/or the steeper the water receiving surface of each paddle must typically be in order to restrict (e.g. prevent) water reaching and flowing over the second end of said paddle. For example, it may be that the water receiving surface of each said paddle comprises the second end of said paddle, and, during the water receiving portion of the rotation cycle for said paddle, an (obtuse) angle between the principal flow direction of the incoming water flow and a tangent to the water receiving surface of said paddle at the second end of said paddle, said tangent being in the plane of rotation of the waterwheel about its axis, is typically less than 160°, or more typically less than 150°, or even more typically less than 140°. It may be that, when the incoming water flow flows onto the waterwheel at a (vertical) height above the (vertical) height of the axis about which the waterwheel is rotatable, the (obtuse) angle between the principal flow direction and the tangent to the water receiving surface of said paddle at the second end of said paddle, said tangent being in the plane of rotation of the waterwheel about the axis, is typically less than 130°, or more typically less than 120°.

The paddle (e.g. the water receiving surface of said paddle) is typically configured (e.g. shaped, for example curved) such that water (i.e. water which has previously flowed downstream from the first end towards the second end) flowing across said paddle in an upstream direction from the second end towards the first end flows substantially smoothly (e.g. maintains laminar flow, i.e. flows laminarly) across the water receiving surface.

Kinetic energy is typically transferred more efficiently from the water to the paddle (and thus the waterwheel) when water flows back down the paddle smoothly (i.e. when the water maintains laminar flow (flows laminarly)) (between the downstream and upstream portions).

It may be that (typically each) said paddle is coupled to a wheel hub which defines the axis of rotation. It may be that (typically each) said paddle is coupled to the wheel hub by way of one or more spokes. Said one or more spokes typically extend radially (in the plane of rotation) from the wheel hub. It may be that (typically each) said paddle is coupled to one or more said spokes (and thus to the wheel hub) by way of one or more support rings.

The waterwheel is typically configured to rotate with a rotational speed, $\omega$, defined by the number of turns (revolutions) completed by the waterwheel about its axis per unit time. The rotational speed of the waterwheel is typically measured in revolutions per minute (rpm). The speed of rotation of the waterwheel about its axis may also be quantified by the angular speed, $\Omega$, typically defined by the angular displacement of a point on the circumference of the waterwheel around the axis per unit time. The angular speed of the waterwheel is typically measured in radians per second (rad/s). The rotational speed of the waterwheel (in rpm) and the angular speed of the waterwheel (in rad/s) are typically related to one another by the following equation:

$$\Omega = \pi/30\omega.$$

Since the waterwheel typically rotates about its axis within a two-dimensional plane of rotation perpendicular to the axis, the angular speed of the waterwheel is also equivalent to an angular velocity of the waterwheel within said plane of rotation.

The rotational speed of the waterwheel (or, equivalently, the angular speed or angular velocity of the waterwheel) as it rotates about its axis typically defines the tangential velocity of any point on the waterwheel. Similarly, the rotational speed of the waterwheel (or, equivalently, the angular speed or angular velocity of the waterwheel) as it rotates about its axis typically defines a tangential speed of any point on the waterwheel, said tangential speed typically being the magnitude of the tangential velocity of said point.

The tangential speed of a point object (i.e. the magnitude of the tangential velocity of said point object) travelling in a circular path about a centre point is defined as the linear speed of that point object at a given time at a given point along said circular path. The direction of the tangential velocity of said point object is taken to point along a tangent to said circular path at said given point along said circular path. Accordingly, during the water receiving portion of the rotation cycle for a said paddle, it may be that the waterwheel is configured to rotate about its axis in said rotational direction at a rotational speed such that a magnitude of the tangential velocity of the first end of the said paddle is less than the speed of the incoming water flow flowing onto the said paddle during the water receiving portion of the rotation cycle for the said paddle.

The waterwheel is typically configured to rotate about its axis in said rotational direction at a rotational speed which permits at least a portion of the incoming water flow received by the water receiving surface to flow across said water receiving surface from the upstream portion of the water receiving surface onto the downstream portion of the water receiving surface (as the waterwheel rotates).

The tangential velocity of the first end of the paddle typically has a component parallel to the principal flow direction of the incoming water flow. The magnitude of the component of the tangential velocity of the first end of the paddle parallel to the principal flow direction is typically less than the speed of the incoming water flow (in that direction).

The magnitude of the tangential velocity of the first end of said paddle is typically the linear speed (i.e. the tangential speed) of the first end of said paddle at any given time and point along a circular path traced by the first end of said paddle as it rotates around the axis of the waterwheel. The direction of the tangential velocity of the first end of said paddle is typically a direction along a tangent to said circular path traced by the first end of said paddle as it rotates around the axis of the waterwheel at said point (said tangent also typically lying in the plane of rotation of the waterwheel about the axis).

As the paddle travels around its circular path, it typically accelerates towards the axis of the waterwheel. The magnitude of the tangential velocity, v, of the first end of the paddle (typically measured in metres/second) is dependent on the rotational speed, $\omega$, and the radial distance of the first end of the paddle from the axis, r, (typically measured in metres). Because different points along the length of the paddle are at different radial distances from the axis, the tangential velocity of the paddle typically varies along the length of the paddle when the waterwheel rotates with a given rotational speed. The first end of the paddle is typically the point on the paddle which is furthest from the axis. Accordingly, the maximum magnitude of the tangential velocity of the paddle is typically found at the first end of said paddle.

Therefore, typically during the entire water receiving portion of the rotation cycle for the or each paddle, the magnitude of the tangential velocity of the first end of said paddle is less than the speed of the incoming water flow. It may be that, during the entire water receiving portion of the rotation cycle for the or each paddle, the component of the tangential velocity of the first end of said paddle parallel to the principal flow direction of the incoming water flow is less than the speed of the incoming water flow (in that direction).

When the waterwheel rotates at constant rotational speed, the magnitude of the tangential velocity at the first end of each paddle is typically constant. However, at a constant rotational speed, the magnitude of the component of the tangential velocity of the first end of each paddle parallel to the principal flow direction of the incoming water flow typically varies as each paddle rotates about the axis. For example, if the principal flow direction lies in a horizontal plane through the centre of the axis of the waterwheel and perpendicular to the plane of rotation, the first end of the paddle will have no component of its tangential velocity parallel to the first principal flow direction when said first end is positioned on said horizontal plane; all of the tangential velocity at said position would point in a direction perpendicular to the principal flow direction. Similarly, the first end of the paddle positioned one quarter of the way around the waterwheel above or below said horizontal plane would have no component of its tangential velocity perpendicular to the principal flow direction; all of the tangential velocity at that point would point in a direction parallel to the principal flow direction.

Nevertheless, the waterwheel is typically configured to rotate (at a rotational speed) such that the component of the tangential velocity of the first end of each paddle parallel to the principal flow direction of the incoming water flow is less than the speed of the incoming water flow (in that direction) during the entire water receiving portion of the rotation cycle for said paddle.

It may be that the waterwheel is configured to rotate (at a rotational speed) such that the component of the tangential velocity of the first end of each paddle parallel to the principal flow direction of the incoming water flow is less than the speed of the incoming water flow (in that direction) during the entire rotation cycle of the waterwheel (e.g. for a constant speed of incoming water flow in the principal flow direction).

It may be that (during the water receiving portion of the rotation cycle for a said paddle) the waterwheel is configured to rotate about its axis in said rotational direction at said rotational speed which permits (a portion of) the incoming water flow to flow across said water receiving surface as the waterwheel rotates, wherein said rotational speed further defines a tangential velocity of the first end of said paddle having a horizontal component which is less than a horizontal component of a velocity of the incoming water flow. Therefore, typically during the entire water receiving portion of the rotation cycle for the or each paddle, the horizontal component of the tangential velocity of the first end of said paddle is less than the horizontal component of the velocity of the incoming water flow.

The inventors have found that the efficiency of the waterwheel (that is to say, the efficiency of the extraction of (kinetic) energy from the incoming water flow) is improved (e.g. maximised) when the waterwheel rotates within a particular (optimum) range of rotational speeds. It may be that the waterwheel is configured to rotate at a rotational speed of between 1 and 5 revolutions per minute (rpm) (equivalent to a range of angular speeds between 0.10 and 0.52 radians per second (rad/s)), or more typically between 1.5 and 2.5 rpm (equivalent to a range of angular speeds between 0.15 and 0.26 radians per second (rad/s)).

It may be that the waterwheel rotates with a substantially constant rotational speed. For example, it may be that the rotational speed of the waterwheel varies (with respect to an average rotational speed) by less than 20%, or more typically less than 10%, as the waterwheel rotates. Rotation of the waterwheel at a substantially constant rotational speed typically results in a substantially constant power output.

It may therefore be that the rotational speed at which the waterwheel rotates is substantially independent of the flow speed of the incoming water flow (in the principal flow direction). As long as the magnitude of the tangential velocity of the first end of (each) said paddle is less than the speed of the incoming water flow, kinetic energy will be extracted from the water by the waterwheel.

The waterwheel is typically suited for extracting kinetic energy from incoming water flows having flow speeds (in the principal flow direction) greater than 3 miles per hour (mph), or more typically greater than 5 mph, or even more typically greater than 10 mph.

The waterwheel is typically configured to rotate (at a rotational speed) such that the magnitude of the tangential velocity of the first end of (each) said paddle is less than 70% of, or more typically less than 50% of, or even more typically less than 30% of, the speed of the incoming water flow (in the principal flow direction).

It may be that the width of the waterwheel (i.e. the width of the waterwheel in a lateral dimension perpendicular to the plane of rotation), including the width of each of the paddles (in said lateral dimension), is selected based on the known or expected flow speed of the incoming water flow (e.g. the known or expected flow speed of a river in which the waterwheel is to be positioned). The faster the incoming water flow, the typically wider the waterwheel and the wider the paddles (i.e. for the same water depth).

It may be that the width of the waterwheel (i.e. the width of the waterwheel in a lateral dimension perpendicular to the plane of rotation), including the width of each of the paddles (in said lateral dimension), is selected based on the known or expected (volumetric) flow rate (i.e. the volume of water flowing onto the waterwheel per unit time) of the incoming water flow (e.g. the known or expected flow rate of a river in which the waterwheel is to be positioned). The faster the incoming water (volumetric) flow rate, the typically wider the waterwheel and the wider the paddles.

The force exerted on the paddle by the weight of water on said paddle typically acts vertically downwards. The force exerted on the paddle by water changing direction as it flows (downstream) from the upstream portion of the water receiving surface to the downstream portion of the water receiving surface is typically exerted on said paddle in a direction perpendicular to said water receiving surface. Similarly, the force exerted on the paddle by water changing direction as it flows (upstream) from the downstream portion of the water receiving surface to the upstream portion of the water receiving surface is typically exerted on said paddle in a direction perpendicular to said water receiving surface.

It may be that said force due to the weight of water on said paddle and said force(s) due to water changing direction as it flows across the water receiving surface act in parallel directions. Alternatively, it may be that said force due to the weight of water on said paddle and said force(s) due to water changing direction as it flows across the water receiving surface act in different directions. However, both said force due to the weight of water on said paddle and said force(s) due to water changing direction as it flows across the water receiving surface typically act on each said paddle to cause rotation of the waterwheel in the rotational direction. Accordingly, the total force on each said paddle, resulting from the vector addition of said force due to the weight of water on said paddle and said force(s) due to water changing direction as it flows across the water receiving surface, typically acts in a direction to cause rotation of the waterwheel in said rotational direction.

Rotation of the waterwheel in said rotational direction typically comprises rotation of the waterwheel such that each said paddle in communication with the incoming water flow travels (vertically) downwards away from the incoming water flow.

It may be that rotation of the waterwheel in said rotational direction comprises rotation of the waterwheel such that each paddle is brought sequentially in and out of communication with the incoming water flow.

The waterwheel is typically a vertically mounted waterwheel. Accordingly, the axis on which said waterwheel is mounted and about which said waterwheel is rotatable is typically a substantially horizontal axis. For example, it may be that said substantially horizontal axis lies in a horizontal plane. Alternatively, it may be that said substantially horizontal axis lies along a direction which intersects the horizontal plane at an (acute) angle typically less than 10°, more typically less than 5°, or even more typically less than 1°.

The plane of rotation is typically perpendicular to said substantially horizontal axis. Alternatively, it may be that said substantially horizontal axis intersects said plane of rotation at an angle less than or greater than 90°, for example at an angle typically between 85° and 95°, or more typically between 89° and 91°, or even more typically between 89.5° and 90.5°.

The waterwheel is typically configured such that water enters the waterwheel at an intermediate height and leaves at a lower height. More specifically, it may be that the first end of each of the said paddles is positioned a distance r from the axis, the waterwheel being configured such that the incoming water flow flows onto the waterwheel at a height of between 0.5r below and 0.5r above the height of the axis. It may be that the height at which the incoming water flow flows onto the waterwheel is a height at which said flow flows onto a said paddle during the water receiving portion of the rotation cycle of the waterwheel for said paddle. However, it may be that water flows onto the waterwheel at a height closer to the height of the axis about which the waterwheel rotates. For example, water may flow onto the waterwheel at a height of between 0.25r below and 0.25r above the height of the axis. It may be that the height at which the incoming water flow flows onto the waterwheel is a height at which said flow flows across an outer circumference of the waterwheel. It may be that said outer circumference of the waterwheel is defined by an outer ring element of said waterwheel. It may be that the outer circumference of the waterwheel is defined by a (imaginary) circle connecting the first ends of each of the plurality of paddles. It may be that the outer circumference of the waterwheel is defined by the circular path traced by the first end of one or more of the plurality of paddles as the waterwheel rotates about the axis.

The waterwheel typically has a diameter D. It will be understood that the diameter D is the diameter of the outer circumference of the waterwheel (wherein the outer circumference of the waterwheel may be defined by the outer ring element of said waterwheel, or by the (imaginary) circle connecting the first ends of each of the plurality of paddles, or by the circular path traced by the first end of one or more of the plurality of paddles as the waterwheel rotates about the axis), such that D=2r (where r is the radius of the waterwheel). It may be that the total number of paddles of the waterwheel is less than $D\pi/0.6$ (i.e. rounded to the nearest whole number), wherein D is measured in metres. It may be that the total number of paddles of the waterwheel is greater than $D\pi/1.4$ (i.e. rounded to the nearest whole number), wherein D is measured in metres. It may be that the total number of paddles of the waterwheel is between $D\pi/0.6$ (i.e. rounded to the nearest whole number) and $D\pi/1.4$ (i.e. rounded to the nearest whole number), wherein D is measured in metres. The total number of paddles of the waterwheel may be approximately $D\pi$ (i.e. rounded to the nearest whole number), wherein D is measured in metres.

It may be that the straight line distance between the first end of a or each paddle and the first end of a or each adjacent paddle (i.e. the first end of a or each paddle immediately adjacent to (i.e. closest to) the said paddle) is greater than 0.6 metres. It may be that the straight line distance between the first end of a or each paddle and the first end of a or each adjacent paddle (i.e. the first end of a or each paddle immediately adjacent to (i.e. closest to) the said paddle) is less than 1.4 metres. It may be that the straight line distance between the first end of a or each paddle and the first end of a or each adjacent paddle (i.e. the first end of a or each paddle immediately adjacent to (i.e. closest to) the said paddle) is between 0.6 metres and 1.4 metres. It may be that the straight line distance between the first end of a or each paddle and the first end of a or each adjacent paddle (i.e. the first end of a or each paddle immediately adjacent to (i.e. closest to) the said paddle) is approximately 1 metre.

By reducing the total number of paddles or by increasing the spacing between adjacent paddles, the overall amount of space occupied by the paddles is reduced and the amount of space in each paddle cell which is available to be filled with water is increased. This means that the waterwheel is typically able to handle larger volumetric flow rates of water than known breastshot waterwheels having similar dimensions. This increases the amount of power which can be generated by the waterwheel.

The waterwheel may be configured such that the incoming water flow flows onto the waterwheel at a (i.e. vertical) height of between 0.3D and 0.5D above the bottom of the waterwheel, wherein the bottom of the waterwheel is the (i.e. vertically) lowest point of the outer circumference of the waterwheel. The waterwheel may be configured such that the incoming water flow flows onto the waterwheel at a (i.e. vertical) height of approximately 0.4D above the bottom of the waterwheel. The height at which the incoming water flow flows onto the waterwheel is typically the height at which said flow flows onto a said paddle during the water receiving portion of the rotation cycle of the waterwheel for said paddle.

It may be that the features of any paddle of the waterwheel of the first aspect of the invention are also features of any other paddles (e.g. each paddle) of said waterwheel of said first aspect of the invention.

The speed of the incoming water flow (in the principal flow direction) is typically variable. Typical incoming water speeds are between 0.5 and 3.5 metres per second (m/s). Such speeds correspond to typical incoming water flow rates (i.e. river flow rates) of between 0.7 and 6 cubic metres per second ($m^3/s$).

It may be that the incoming water flow comprises (e.g. is) a flow of water from one of the following: a river, a stream, a canal. It may be that said incoming water flow comprises (e.g. is a flow of) water flowing directly from said river, stream or canal. The waterwheel is particularly suited to extracting energy from a fast-flowing incoming water flow (such as a fast-flowing river).

A second aspect of the invention provides for waterwheel apparatus comprising the waterwheel according to the first aspect of the invention. The waterwheel apparatus may further comprise a channel configured to direct water onto the waterwheel. For example, the channel may be a gutter or a flume. It may be that the channel (e.g. the gutter or flume) is configured to control the speed of the incoming water flow (in the principal flow direction) flowing onto the waterwheel. For example, a narrow channel may be used to increase the speed of water flow. Additionally or alternatively, the channel (e.g. the gutter or flume) may be configured to define the principal flow direction. For example, the waterwheel may be positioned adjacent to a river (and thus not in a direct flow path of water flowing in the river) and a gutter may be configured to direct water from the river towards the waterwheel. Additionally or alternatively, the channel (e.g. the gutter or flume) may be configured to determine the angle between the principal flow direction and the tangent to the water receiving surface of the first end of each said paddle in communication with the incoming water flow. Additionally or alternatively, the channel (e.g. the gutter or flume) may be configured to determine the height at which water flows onto the waterwheel.

The channel (e.g. the gutter or flume) may comprise first and second channel-forming walls (i.e. first and second gutter-forming or flume-forming walls). The first and second channel-forming walls (e.g. first and second gutter-forming or flume-forming walls) may be configured (e.g. dimensioned and/or positioned) to determine the (volumetric) flow rate and/or flow speed of water flowing onto the waterwheel. For example, the heights of said first and second channel-forming walls (e.g. first and second gutter-forming or flume-forming walls) may be configured (e.g. selected) to determine the (volumetric) flow rate and/or flow speed of water flowing onto the waterwheel.

The channel (e.g. the gutter or flume) may have a substantially rectangular cross-section perpendicular to the principal flow direction. The corners of the substantially rectangular cross-section may be substantially rounded. Each of the first and second channel-forming walls (e.g. first and second gutter-forming or flume-forming walls) may extend substantially perpendicularly away from a base of the channel (e.g. the gutter or flume). For example, the base of the channel (e.g. the gutter or flume) may be substantially horizontal and the first and second channel-forming walls (e.g. first and second gutter-forming or flume-forming walls) may extend substantially vertically away from said base.

The channel (e.g. the gutter or flume) may be configured (e.g. positioned) such that between 30% and 50% of the volume of water flowing in the channel (e.g. the gutter or flume) (e.g. on average) is below a (i.e. vertical) height of between 0.3D and 0.5D above the bottom of the waterwheel, and the remaining volume of water flowing in the channel (e.g. the gutter or flume) is (e.g. on average) above the (i.e. vertical) height of between 0.3D and 0.5D above the bottom of the waterwheel. The channel (e.g. the gutter or flume) may be configured (e.g. positioned) such that approximately 40% of the volume of water flowing in the channel (e.g. the gutter or flume) is (e.g. on average) below a (i.e. vertical) height of between 0.3D and 0.5D above the bottom of the waterwheel, and the remaining volume of water flowing in the channel (e.g. the gutter or flume) is (e.g. on average) above the (i.e. vertical) height of between 0.3D and 0.5D above the bottom of the waterwheel. The channel (e.g. the gutter or flume) may be configured (e.g. positioned) such that between 30% and 50% of the volume of water flowing in the channel (e.g. the gutter or flume) is (e.g. on average) below a (i.e. vertical) height of approximately 0.4D above the bottom of the waterwheel, and the remaining volume of water flowing in the channel (e.g. the gutter or flume) is (e.g. on average) above the (i.e. vertical) height of between 0.4D above the bottom of the waterwheel. The channel (e.g. the gutter or flume) may be configured (e.g. positioned) such that approximately 40% of the volume of water flowing in the channel (e.g. the gutter or flume) is (e.g. on average) below a (i.e. vertical) height of approximately 0.4D above the bottom of the waterwheel, and the remaining volume of water flowing in the channel (e.g. the gutter or flume) is (e.g. on average) above the (i.e. vertical) height of approximately 0.4D above the bottom of the waterwheel.

An example of a particular percentage of the volume of water flowing in the channel (e.g. the gutter or flume) on average below or above a particular (i.e. vertical) height above the bottom of the waterwheel is the said particular percentage of the mean volume of water flowing in the channel during at least one rotation cycle of the waterwheel about the axis flowing below or above (as the case may be) the said particular (i.e. vertical) height above the bottom of the waterwheel.

The waterwheel may be mounted within a wheel pit. A downstream end of the channel (e.g. the gutter or flume) may extend into the wheel pit.

The water in the channel (e.g. the gutter or flume) may have a depth d. The depth d is typically the depth of water in the channel (e.g. the gutter or flume) upstream of the waterwheel. The depth d is typically the depth of water in the channel (e.g. the gutter or flume) upstream of the downstream end of the channel (e.g. the gutter or flume). The depth d is typically the depth of water in the channel (e.g. the gutter or flume) measured sufficiently upstream of the waterwheel (or sufficiently upstream of the downstream end of the channel (e.g. gutter or flume)) that it is not substantially affected by the presence of the waterwheel or downstream end of the channel (e.g. gutter or flume), i.e. the depth is measured upstream of a region (the "drawdown region") in which the water level in the channel (e.g. gutter or flume) falls due to water flowing out of the channel (e.g. gutter or flume) and onto the waterwheel. For example, the depth d may be the depth of water in the channel (e.g. the gutter or flume) measured a distance approximately 4d upstream from the waterwheel (or from the downstream end of the channel (e.g. the gutter or flume)).

The channel (e.g. the gutter or flume) may be configured (e.g. positioned) such that the base of the channel (e.g. the gutter or flume) is at a (i.e. vertical) height of approximately 0.4D-0.4d above the bottom of the waterwheel. It may be that the channel (e.g. the gutter or flume) is configured (e.g. positioned) such that the base of the channel (e.g. the gutter or flume) is at a (i.e. vertical) height of between 0.3D-0.5d and 0.5D-0.3d above the bottom of the waterwheel.

Known waterwheel apparatus typically comprise incoming water flow directors (which may also function as incoming water flow speed moderators), such as a sluice, an underweir or a coulisse, configured to direct water generally downwards (i.e. in a downwards direction having a substantial vertical component) onto the waterwheel and/or to slow down water flowing onto the waterwheel, as is commonly believed necessary in order to reduce turbulence on each paddle and to maximise efficiency of energy extraction. In contrast, the waterwheel apparatus of the present invention does not typically comprise incoming water flow directors such as a sluice, an underweir or a coulisse. Indeed, the waterwheel apparatus of the present invention is typically configured to at least preserve (and possibly to enhance or to maximise) both the (substantially horizontal) principal flow direction and the flow speed of the incoming water flow as it flows onto the waterwheel.

The waterwheel apparatus may comprise a filter. For example, the waterwheel apparatus may comprise a mesh, a grid and/or a net configured to restrict flow of debris, plants or animals (such as fish) from the incoming water flow onto the waterwheel. The filter is typically configured to reduce (e.g. minimise) any effect on the flow speed or principal flow direction of the incoming water flow and/or to reduce (e.g. minimise) damage to wildlife.

The waterwheel may be configured (e.g. positioned) such that a portion of the waterwheel is submerged (repeatedly, sequentially and/or continuously) in water (at the exit) as the waterwheel rotates. For example, at least a portion of one or more paddles may be submerged in water for at least a portion of the rotation cycle of the waterwheel about the axis.

The waterwheel apparatus may further comprise a water director downstream of the waterwheel (i.e. from the point of water exit from the waterwheel) such as a tailrace. It may be that said portion of the waterwheel or said at least a portion of the one or more paddles is submerged (repeatedly, sequentially and/or continuously) in water (at the exit) in the tailrace.

Alternatively, the waterwheel may be configured (e.g. positioned) such that none of the paddles is submerged in water (in the tailrace) during an entire rotation cycle of the waterwheel about the axis.

The downstream water director (e.g. the tailrace) is typically configured to minimise back pressure on the waterwheel from water exiting the waterwheel. For example, a base of the tailrace may slope away from the waterwheel (in a downstream direction) such that water exiting the waterwheel flows (downstream) away from the waterwheel. The tailrace (e.g. side walls of the tailrace) may be configured to direct water exiting the waterwheel laterally (i.e. in a direction having a horizontal component perpendicular to the principal flow direction) away from the waterwheel. For example, the tailrace (e.g. side walls of the tailrace) may be configured to direct water exiting the waterwheel laterally (i.e. in a direction having a horizontal component perpendicular to the principal flow direction) away from the waterwheel at an angle of between 10° and 45° to the principal flow direction, or more typically at an angle of around 30° to said principal flow direction.

A third aspect of the invention provides for waterwheel apparatus according to the second aspect of the invention, or waterwheel apparatus comprising the waterwheel according to the first aspect of the invention, further comprising an electricity generator coupled to the waterwheel such that rotation of the waterwheel causes the electricity generator to generate electricity. For example, the waterwheel may be mounted on a rotatable shaft or axle. The rotatable shaft or axle may lie along the axis about which the waterwheel rotates. Rotation of the waterwheel about its axis may cause rotation of the rotatable shaft or axle. Rotation of the rotatable shaft or axle may be used to drive the electricity generator. The electricity generator typically converts kinetic energy of the rotating shaft or axle into electrical energy.

The waterwheel may be coupled to the electricity generator by way of a transmission and/or one or more gears (e.g. a gearbox).

It may be that the rotational speed of the waterwheel is (at least partially) dependent on (i.e. determined by, for example controlled by) the properties of the electricity generator (and/or the transmission and/or the one or more gears). It may be that the electricity generator (and/or the transmission and/or the one or more gears) controls (at least in part) the rotational speed of the waterwheel. It may be that the electricity generator (and/or the transmission and/or the one or more gears) has a braking effect on the waterwheel. It may be that the rotational speed of the waterwheel is controlled by varying a load of the electricity generator. It may be that the rotational speed of the waterwheel is controlled by varying the power output by the electricity generator.

It may be that the waterwheel is provided (i.e. installed) (immediately) downstream of a weir in a river. It may be that the waterwheel is provided (i.e. installed) (immediately) adjacent to a river bank of said river. It may be that the waterwheel is provided (i.e. installed) (immediately) adjacent to said river bank of said river at a bend in said river (i.e. at a river bend). Accordingly, large objects floating in the river (for example fallen tree branches) are typically directed over the weir away from the waterwheel.

A fourth aspect of the invention provides a method of extracting energy from an incoming water flow, the method comprising: providing a breastshot waterwheel in communication with the incoming water flow, the breastshot waterwheel comprising a plurality of paddles and rotating in a rotational direction (e.g. the waterwheel being rotated by the incoming water flow in the rotational direction) about an axis such that each of the said paddles is brought (sequentially) into communication with the incoming water flow for a respective water receiving portion of a rotation cycle of the waterwheel about the said axis; during the water receiving portion of the rotation cycle for a said paddle (e.g. during the water receiving portion of the rotation cycle for each said paddle), the incoming water flow flowing onto a water receiving surface of said paddle, said water receiving surface extending between first and second ends of said paddle, the first end being upstream of the second end; during at least a portion of said water receiving portion of the rotation cycle for (each) said paddle (e.g. during the entire water receiving portion of the rotation cycle for (each) said paddle), the incoming water flow flowing in a substantially horizontal direction across the first end of the paddle onto an upstream portion of the water receiving surface; and at least a portion of the incoming water flow received by the upstream portion of the water receiving surface of the said paddle flowing (subsequently) from the upstream portion onto a downstream portion of said water receiving surface of said paddle, thereby changing direction and exerting a force on said paddle causing the waterwheel to rotate in said rotational direction, wherein a magnitude of a tangential velocity of the first end of the (e.g. each) said paddle is less than a speed of the incoming water flow flowing across the first end of the said paddle during the water receiving portion of the rotation cycle for the said paddle.

The method may further comprise: positioning the waterwheel relative to the incoming water flow such that, during at least a portion of the (e.g. a majority of the, for example the entire) water receiving portion of the rotation cycle for said paddle (or during at least a portion of the (e.g. a majority of the, for example the entire) water receiving portion of the rotation cycle for each said paddle), an (acute) angle between the principal flow direction of the incoming water flow and a tangent to the water receiving surface at the first end of said paddle, said tangent being in a plane of rotation of the waterwheel about said axis, is less than 35°, or more typically less than 25°, or even more typically less than 15°, or even more typically less than 5°. Accordingly, the direction of flow (and/or the velocity) of water in the incoming water flow does not change significantly as it flows (initially) onto said paddle. A significant proportion (preferably a majority) of the momentum of the water is thus maintained. A significant proportion (preferably a majority) of the kinetic energy of the incoming water flow flowing onto each said paddle is, therefore, initially preserved. The greater the proportion of the kinetic energy of the incoming water flow which is preserved as the water flows onto each said paddle, the greater the quantity of kinetic energy which can subsequently be transferred to each said paddle, and the greater the efficiency of the waterwheel.

The method may further comprise: positioning the waterwheel relative to the incoming water flow and configuring the waterwheel such that, during at least a portion of the (e.g. a majority of the, for example the entire) water receiving portion of the rotation cycle for said paddle (or during at least a portion of the (e.g. a majority of the, for example the entire) water receiving portion of the rotation cycle for each said paddle), the water receiving surface at the first end of said paddle faces downstream (i.e. said water receiving surface at the first end of said paddle faces in a direction having a component which extends in a downstream direction, i.e. in the direction of the principal flow direction of the incoming water flow). The method may further comprise: positioning the waterwheel relative to the incoming water flow and configuring the waterwheel such that, during at least a portion of the (e.g. a majority of the, for example the entire) water receiving portion of the rotation cycle for said paddle (or during at least a portion of the (e.g. a majority of the, for example the entire) water receiving portion of the rotation cycle for each said paddle), a normal to the water receiving surface at the first end of said paddle has a (positive) component in a downstream direction ((i.e. the normal points downstream) and the (acute) angle between the principal flow direction of the incoming water flow and the tangent to the water receiving surface at the first end of said paddle, said tangent being in a plane of rotation of the waterwheel about said axis, is less than 10°, or more typically less than 5°.

The method may further comprise: positioning the waterwheel relative to the incoming water flow and configuring the waterwheel such that, during at least a portion of the (e.g. a majority of the, for example the entire) water receiving portion of the rotation cycle for said paddle (or during at least a portion of the (e.g. a majority of the, for example the entire) water receiving portion of the rotation cycle for each said paddle), the water receiving surface at the first end of said paddle faces upstream (i.e. said water receiving surface at the first end of said paddle faces in a direction having a component which extends in an upstream direction, i.e. opposite to the direction of the principal flow direction of the incoming water flow). Accordingly, the method may further comprise: positioning the waterwheel relative to the incoming water flow and configuring the waterwheel such that, during at least a portion of the (e.g. a majority of the, for example the entire) water receiving portion of the rotation cycle for said paddle (or during at least a portion of the (e.g. a majority of the, for example the entire) water receiving portion of the rotation cycle for each said paddle), the normal to the water receiving surface at the first end of said paddle has a (positive) component in an upstream direction and the (acute) angle between the principal flow direction of the incoming water flow and the tangent to the water receiving surface at the first end of said paddle, said tangent being in a plane of rotation of the waterwheel about said axis, is less than 35°, or more typically less than 25°, or more typically less than 15°, or even more typically less than 5°.

It may be that the tangent to the water receiving surface at the first end of said paddle is a tangent to the water receiving surface at a first edge of said water receiving surface at the first end of said paddle (said tangent also typically lying in the plane of rotation of the waterwheel). It may be that the normal to the water receiving surface at the first end of said paddle is a normal to the water receiving surface at said first edge of said water receiving surface at the first end of said paddle (said normal also typically lying in the plane of rotation of the waterwheel).

The method may further comprise: positioning the waterwheel relative to the incoming water flow and configuring the waterwheel such that, during at least a portion of the (e.g. a majority of the, for example the entire) water receiving portion of the rotation cycle for said paddle (or during at least a portion of the (e.g. a majority of the, for example the entire) water receiving portion of the rotation cycle for each said paddle), an (acute) angle between the tangent to the water receiving surface at the first end of said paddle and the horizontal (i.e. a horizontal plane) is less than 35°, or more typically less than 25°, or more typically less than 15°, or even more typically less than 5°. Accordingly, it may be that the tangent to the water receiving surface at the first end of said paddle is (substantially) horizontal (i.e. lies (substantially) in a horizontal plane) during at least a portion of the (e.g. a majority of the, for example the entire) water receiving portion of the rotation cycle for said paddle.

It may be that the paddles are arranged periodically around the axis about which the waterwheel is rotatable. For example, the paddles may be arranged such that the water receiving surface of each paddle typically faces (at least partially) (vertically) upwards during the water receiving portion of the rotation cycle for said paddle. It may be that each paddle comprises an underside surface opposite its water receiving surface. It may be that the paddles are arranged such that the water receiving surface of each of the said paddles faces the underside surface of another of the said paddles.

It may be that said paddles are fixedly arranged around the axis. Accordingly, it may be that rotation of the waterwheel about the axis comprises rotation (e.g. rigid rotation) of the plurality of paddles with the waterwheel around the axis. Said paddles are typically arranged around said waterwheel such that rotation of the waterwheel about the axis brings each paddle sequentially in and out of communication with the incoming water flow.

It may be that each of the first ends of the said paddles are spaced equally apart from one another around the axis. This typically ensures that the waterwheel rotates at a constant rotational speed, during its rotational cycle, when water flows onto the waterwheel at a constant flow rate and when each paddle is substantially identical.

It may be that the number of paddles in said plurality of paddles is a prime number. Having a prime number of paddles typically reduces harmonic vibrations of the waterwheel as it rotates about the axis.

The method may comprise the paddles of the waterwheel receiving the incoming water flow at a (i.e. vertical) height of between 0.3D and 0.5D above the bottom of the waterwheel, wherein the bottom of the waterwheel is located at the (i.e. vertically) lowest point on the outer circumference of the waterwheel. The method may comprise the paddles of the waterwheel receiving the incoming water flow at a (i.e. vertical) height of approximately 0.4D above the bottom of the waterwheel. It will be understood that the height at which the paddles receive the incoming water flow is the height at which the said incoming water flow flows onto a said paddle during the water receiving portion of the rotation cycle of the waterwheel for said paddle.

It may be that the upstream and the downstream portions of the water receiving surface of said paddle are configured such that water flowing from the upstream portion onto the downstream portion changes direction (thereby exerting a force on the paddle).

It may be that the relative orientation of the upstream and the downstream portions of the water receiving surface of said paddle is configured such that water flowing from the upstream portion onto the downstream portion changes direction (thereby exerting a force on the paddle). The method may further comprise: positioning the waterwheel relative to the incoming water flow and configuring the waterwheel such that, during at least a portion of the (e.g. a majority of the, for example the entire) water receiving portion of the rotation cycle for said paddle (or during at least a portion of the (e.g. a majority of the, for example the entire) water receiving portion of the rotation cycle for each said paddle), water flowing from the upstream portion of said paddle onto the downstream portion of said paddle changes direction (thereby exerting a force on the paddle).

It may be that an (obtuse) angle between (e.g. formed between or enclosed between) the upstream portion of the water receiving surface of said paddle and the downstream portion of the water receiving surface of said paddle (e.g. an (obtuse) angle between a tangent to the upstream portion of the water receiving surface of said paddle and a tangent to the downstream portion of the water receiving surface of said paddle) is less than 160°, or more typically less than 150°, or more typically less than 140°, or more typically less than 130°, or more typically less than 120°, or more typically less than 110°, or even more typically less than 100°.

It may be that at least a portion of the water receiving surface of said paddle is (longitudinally) curved in said plane of rotation of the waterwheel about said axis.

It may be that at least a portion of the water receiving surface of said paddle is (longitudinally) curved such that the relative orientation of the upstream and the downstream portions of the water receiving surface of said paddle is configured such that water flowing from the upstream portion onto the downstream portion changes direction (thereby exerting a force on the paddle).

It may be that at least a portion of the water receiving surface of said paddle is (longitudinally) curved such that the (obtuse) angle between the upstream portion of the water receiving surface of said paddle and the downstream portion of the water receiving surface of said paddle (e.g. the (obtuse) angle between a tangent to the upstream portion of the water receiving surface of said paddle and a tangent to the downstream portion of the water receiving surface of said paddle) is less than 160°, or more typically less than 150°, or more typically less than 140°, or more typically less than 130°, or more typically less than 120°, or more typically less than 110°, or even more typically less than 100°.

It may be that the water receiving surface of the paddle curves through an angle of between 10° and 110°, or more typically between 20° and 100°, or more typically between 30° and 90°, between the upstream portion and the downstream portion of said water receiving surface.

It may be that at least a portion of the water receiving surface of said paddle is (longitudinally) curved such that the curvature of the upstream portion of the water receiving surface of said paddle is different to the curvature of the downstream portion of the water receiving surface of said paddle.

It may be that the curvature of the upstream portion of the water receiving surface of said paddle is greater than the curvature of the downstream portion of the water receiving surface of said paddle.

It may be that the upstream portion of the water receiving surface of the paddle is (longitudinally) curved and the downstream portion of the water receiving surface of the paddle is not (longitudinally) curved.

It may be that the (longitudinal) curvature of the water receiving surface of the paddle varies between the upstream and downstream portions of said water receiving surface.

It may be that at least a portion of the water receiving surface of said paddle is concave. It may be that the entire water receiving surface of said paddle is concave. It may be that the paddle is concave. It may be that the (at least a portion of the) water receiving surface and/or the paddle is concave and faces (vertically) upwards during at least a portion of the water receiving portion of the rotation cycle for said paddle.

It may be that the at least a portion of the water receiving surface of each paddle which is curved comprises the first end of said paddle. Alternatively, it may be that the at least a portion of the water receiving surface of each paddle which is curved does not comprise the first end of said paddle. It may be that the at least a portion of the water receiving surface of each paddle which is curved comprises the second end of said paddle. Alternatively, it may be that the at least a portion of the water receiving surface of each paddle does not comprise the second end of said paddle. It may be that the at least a portion of the water receiving surface of each paddle which is curved is a portion of said water receiving surface intermediate the first and second ends. It may be that the at least a portion of the water receiving surface of each paddle which is curved is a portion of said water receiving surface from the first end to an intermediate portion between the first and second ends. It may be that the at least a portion of the water receiving surface of each paddle which is curved is a portion of said water receiving surface from the second end to an intermediate portion between the first and second ends. It may be that the at least a portion of the water receiving surface of each paddle comprises the entire water receiving surface of said paddle (e.g. from the first end to the second end).

It may be that the water receiving surface of each paddle, or a portion thereof, is longitudinally curved (that is to say, curved along a direction from the first end of said paddle towards the second end of said paddle in the plane of rotation).

It may be that the water receiving surface of said paddle is curved along a length of said paddle from the first end of said paddle to the second end of said paddle.

It may be that a longitudinal curvature of the water receiving surface of each paddle is constant along the length of said paddle from the first end to the second end. Alternatively, the longitudinal curvature of the water receiving surface of each paddle may vary along the length of said paddle from the first end to the second end. It may be that a portion or portions of the water receiving surface of each paddle are longitudinally flat (that is to say, they may have zero curvature along the direction from the first end of said paddle towards the second end of said paddle).

It may be that a (longitudinal) curvature of the water receiving surface of said paddle is greater towards the first end of said paddle than it is towards the second end of said paddle. It may be that the (longitudinal) curvature of the water receiving surface of said paddle (continuously)

decreases along the longitudinal direction from the first end of the paddle towards the second end of the paddle.

The paddle is typically configured such that water flows substantially smoothly across the water receiving surface thereof. For example, it may be that the paddle is configured such that water maintains laminar flow (i.e. flows laminarly) as it flows across the water receiving surface thereof. Accordingly, it may be that the paddle is configured such that a flow of water across the water receiving surface thereof (i.e. between the upstream and downstream portions) is laminar. It may be that the water receiving surface of the paddle is configured (e.g. shaped) such that water flows substantially smoothly thereacross (e.g. between the upstream and downstream portions thereof). It may be that the water receiving surface of the paddle is configured (e.g. shaped) such that water maintains laminar flow (i.e. flows laminarly) as it flows thereacross (e.g. between the upstream and downstream portions thereof). It may be that the paddle (and/or the water receiving surface of said paddle) is continuously curved such that water flows substantially smoothly and/or maintains laminar flow (i.e. flows laminarly) as it flows across the water receiving surface (e.g. between the upstream and downstream portions thereof). It may be that the water receiving surface is configured such that a flow of water thereacross (e.g. between the upstream and downstream portions) is laminar. It may be that water flowing across said continuously curved water receiving surface maintains laminar flow for (substantially) longer than water flowing across a discontinuously curved water receiving surface or a water receiving surface comprising both curved and longitudinally flat portions or comprising connected non-parallel longitudinally flat portions.

Accordingly, the method may further comprise: positioning the waterwheel relative to the incoming water flow and configuring the waterwheel such that, during at least a portion of the (e.g. a majority of the, for example the entire) water receiving portion of the rotation cycle for said paddle (or during at least a portion of the (e.g. a majority of the, for example the entire) water receiving portion of the rotation cycle for each said paddle), water flows substantially smoothly (e.g. maintains laminar flow (i.e. flows laminarly)) across the water receiving surface of said paddle.

Kinetic energy is typically transferred more efficiently from the water to the paddle (and thus the waterwheel) when water flows across the water receiving surface smoothly (i.e. when the water maintains laminar flow (flows laminarly) thereacross) (between the upstream and downstream portions). Kinetic energy is therefore typically not wasted through excessive turbulence (i.e. through turbulent flow) as water flows across the water receiving surface.

It may be that the first end of (each) said paddle is positioned a distance r from the axis and that a longitudinal length of the water receiving surface of said paddle (for example a longitudinal length of said paddle along a direction from the first end of said paddle to the second end of said paddle) is between 0.5r and r. That is to say, the water receiving surface of (each) said paddle is typically substantially long relative to the external dimensions of the waterwheel.

The water receiving surface of (each) said paddle is typically longer than the water receiving surface of the paddles of known, similarly sized, breastshot waterwheels. For example, a longitudinal length of the water receiving surface of the or each said paddle (e.g. a longitudinal length of the or each said paddle) may be between 1 metre and 10 metres, or more typically between 2 metres and 7 metres. It may be that the longitudinal length of the or each said paddle is at least 1 metre, or more typically at least 1.5 metres, or even more typically at least 2 metres, or even more typically at least 2.5 metres. The longitudinal length of the or each said paddle is typically the length of the straight line distance between the first and second ends of the said paddle.

A radius of the waterwheel is typically defined as the distance r between the first end of (each) said paddle and the axis of rotation. Accordingly, the radius of the waterwheel may be between 1 metre and 10 metres, or more typically between 2 metres and 7 metres. It may be that the radius of the waterwheel is at least 1 metre, or more typically at least 1.5 metres, or even more typically at least 2 metres, or even more typically at least 2.5 metres.

It may be that (each) said paddle is coupled to a wheel hub which defines the axis of rotation. It may be that (each) said paddle is coupled to the wheel hub by way of one or more spokes. Said one or more spokes typically extend radially (in the plane of rotation) from the wheel hub. It may be that (each) said paddle is coupled to the one or more spokes (and thus to the wheel hub) by way of one or more support rings.

The (e.g. length of the) water receiving surface of (each) said paddle is typically configured (i.e. selected) such that at least a portion of the incoming water flow (which has flowed onto said paddle) flows downstream from the first end of the paddle towards the second end of the paddle and decelerates to a zero flow speed (relative to the water receiving surface of the paddle) before reaching the second end of the paddle. Water which has travelled up the paddle (in the downstream direction) therefore typically subsequently flows back down the paddle (in an upstream direction) towards the first end (due to (the force of) gravity acting on the water). Accordingly, the method may further comprise: the at least a portion of the incoming water flow which flows from the upstream portion onto the downstream portion of the water receiving surface (subsequently) flowing back down the paddle (in an upstream direction) towards the first end.

Water which flows back down the paddle typically flows from the downstream portion of the water receiving surface onto the upstream portion of the water receiving surface and consequently changes direction, thereby exerting a further force on the paddle (again due to the change in momentum of the water). Accordingly, the method may further comprise: at least a portion of the incoming water flow flowing from the downstream portion of the water receiving surface onto the upstream portion of the water receiving surface and consequently changing direction, thereby exerting a force on the paddle. Additional kinetic energy is therefore transferred from the water to the paddle as the water flows back down the paddle. Paddles having sufficient length such that, in use, water (flowing across the water receiving surface) typically does not flow over (i.e. beyond) the second end typically increase the efficiency of the waterwheel.

It may be that a paddle wall is provided at the second end of (each) said paddle, the paddle wall being configured to restrict (e.g. prevent) flow of water across the second end of the paddle in the downstream direction (i.e. to prevent water escaping from the paddle in the downstream direction). Accordingly, the method may further comprise the step of: restricting (e.g. preventing) flow of water across the second end of the paddle in the downstream direction. The paddle wall may extend from the water receiving surface of said paddle at the second end. The paddle wall may extend from the water receiving surface at the second end in a direction which is substantially perpendicular to the water receiving surface at the second end. It may be that the paddle wall extends between said paddle and (an underside of) another adjacent paddle. It may be that the paddle wall (at least partially) encloses a space between the water receiving surface of the paddle and (the underside of) the adjacent paddle (thereby forming a (at least partially enclosed) paddle cell).

However, it may also be that no such paddle wall is provided at the second end of (each) said paddle. It may be that a space between (e.g. a paddle cell between) the water receiving surface of the paddle and (the underside of) the adjacent paddle is open at the second end of the paddle, such that flow of water across the second end of the paddle in the downstream direction is not restricted (e.g. prevented). Water flowing sufficiently quickly may therefore escape from the paddle in the downstream direction. Accordingly, it may be that the length of the water receiving surface of the paddle is configured (i.e. selected) such that the incoming water flow which flows onto said paddle flows downstream from the first end of the paddle towards the second end of the paddle and decelerates to a zero flow speed before reaching the second end of the paddle, such that less than 20%, or more typically less than 10%, or even more typically less than 5%, of the at least a portion of the incoming water flow which flows from the upstream portion onto the downstream portion of said water receiving surface escapes from the paddle across the second end.

Additionally or alternatively, the orientation of the water receiving surface of the or each said paddle may be configured (i.e. selected) such that at least a portion (for example at least 50%, or more typically at least 70%) of the incoming water flow (which has flown onto said paddle) flows downstream from the first end of the paddle towards the second end of the paddle and decelerates to a zero flow speed relative to the paddle before reaching the second end of the paddle.

As water flows onto and/or across each said paddle, weight of the water under gravity exerts a force on said paddle (vertically downwards) causing the waterwheel to rotate in said rotational direction. Accordingly, the method may further comprise: weight of water from the incoming water flow on the water receiving surface of said paddle exerting a force on said paddle due to gravity, thereby causing the waterwheel to rotate in said rotational direction.

The paddle (e.g. the water receiving surface of said paddle) is typically configured (e.g. shaped, for example curved) such that water (i.e. water which has previously flowed downstream from the first end to the second end) flowing across said paddle in an upstream direction from the second end to the first end flows substantially smoothly (e.g. maintains laminar flow, i.e. flows laminarly) across the water receiving surface. Accordingly, the method may further comprise: water (i.e. water which has previously flowed downstream from the first end to the second end) flowing substantially smoothly (e.g. while maintaining laminar flow, i.e. flowing laminarly) across the paddle in an upstream direction from the second end to the first end. Kinetic energy is typically transferred more efficiently from the water to the paddle (and thus the waterwheel) when water flows back down the paddle smoothly (i.e. when the water maintains laminar flow (flows laminarly)) (between the downstream and upstream portions).

It may be that said force due to the weight of water on said paddle and said force(s) due to water changing direction as it flows across the water receiving surface act in parallel directions. Alternatively, it may be that said force due to the weight of water on said paddle and said force(s) due to water changing direction as it flows across the water receiving surface act in different directions. However, both said force due to the weight of water on said paddle and said force(s) due to water changing direction as it flows across the water receiving surface typically act on each said paddle to cause rotation of the waterwheel in the rotational direction. Accordingly, the total force on each said paddle, resulting from the vector addition of said force due to the weight of water on said paddle and said force(s) due to water changing direction as it flows across the water receiving surface, typically acts in a direction to cause rotation of the waterwheel in said rotational direction. The method may therefore further comprise: the force due to weight of water on said paddle and the force(s) due to water changing direction as it flows across the water receiving surface acting on each paddle to cause rotation of the waterwheel in the rotational direction.

Rotation of the waterwheel in said rotational direction typically comprises rotation of the waterwheel such that each said paddle in communication with the incoming water flow travels (vertically) downwards, and away from the incoming water flow.

The method may further comprise: directing the incoming water flow onto the waterwheel. For example, the method may comprise: directing the incoming water flow onto the waterwheel by way of a channel (such as a gutter or a flume). It may be that the channel (e.g. the gutter or flume) is configured to control the speed of the incoming water flow in the principal flow direction. For example, a narrow, or steeper, channel may be used to increase the speed of water flow. Additionally or alternatively, the method may comprise controlling the principal flow direction (e.g. by way of a channel such as a gutter or flume). For example, the method may comprise positioning the waterwheel adjacent to a river (and thus not in a direct flow path of water flowing in the river) and configuring a gutter to direct water from the river towards the waterwheel. Additionally or alternatively, the method may comprise configuring the channel (e.g. the gutter or flume) to determine the angle between the principal flow direction and the tangent to the water receiving surface of the first end of each said paddle in communication with the incoming water flow. Additionally or alternatively, the method may comprise configuring the channel (e.g. the gutter or flume) to determine the height at which the incoming water flow flows onto the waterwheel.

The channel (e.g. the gutter or flume) may comprise first and second channel-forming walls (i.e. first and second gutter-forming or flume-forming walls). The method may therefore comprise configuring the first and second channel-forming walls (e.g. first and second gutter-forming or flume-forming walls) to determine the (volumetric) flow rate and/or flow speed of water flowing onto the waterwheel. For example, the method may comprise configuring (e.g. selecting) heights of said first and second channel-forming walls (e.g. first and second gutter-forming or flume-forming walls) to determine the (volumetric) flow rate and/or flow speed of water flowing onto the waterwheel.

The channel (e.g. the gutter or flume) may have a substantially rectangular cross-section perpendicular to the principal flow direction. The corners of the substantially rectangular cross-section may be substantially rounded. Each of the first and second channel-forming walls (e.g. first and second gutter-forming or flume-forming walls) may extend substantially perpendicularly away from a base of the channel (e.g. the gutter or flume). For example, the base of the channel (e.g. the gutter or flume) may be substantially horizontal and the first and second channel-forming walls (e.g. first and second gutter-forming or flume-forming walls) may extend substantially vertically away from said base.

The method may comprise between 30% and 50% of the volume of water in the channel (e.g. the gutter or flume) flowing (e.g. on average) below a (i.e. vertical) height of between 0.3D and 0.5D above the bottom of the waterwheel, and the remaining volume of water in the channel (e.g. the gutter or flume) flowing (e.g. on average) above the (i.e. vertical) height of between 0.3D and 0.5D above the bottom of the waterwheel. The method may comprise approximately 40% of the volume of water in the channel (e.g. the gutter or flume) flowing (e.g. on average) below a (i.e. vertical) height of between 0.3D and 0.5D above the bottom of the waterwheel, and the remaining volume of water in the channel (e.g. the gutter or flume) flowing (e.g. on average) above the (i.e. vertical) height of between 0.3D and 0.5D above the bottom of the waterwheel. The method may comprise between 30% and 50% of the volume of water in the channel (e.g. the gutter or flume) flowing (e.g. on average) below a (i.e. vertical) height of approximately 0.4D above the bottom of the waterwheel, and the remaining volume of water in the channel (e.g. the gutter or flume) flowing (e.g. on average) above the (i.e. vertical) height of between 0.4D above the bottom of the waterwheel. The method may comprise approximately 40% of the volume of water in the channel (e.g. the gutter or flume) flowing (e.g. on average) below a (i.e. vertical) height of approximately 0.4D above the bottom of the waterwheel, and the remaining volume of water in the channel (e.g. the gutter or flume) flowing (e.g. on average) above the (i.e. vertical) height of approximately 0.4D above the bottom of the waterwheel.

The waterwheel may be mounted within a wheel pit. A downstream end of the channel (e.g. the gutter or flume) may extend into the wheel pit.

The water in the channel (e.g. the gutter or flume) may have a depth d. The depth d is typically the depth of water in the channel (e.g. the gutter or flume) upstream of the waterwheel. The depth d is typically the depth of water in the channel (e.g. the gutter or flume) upstream of the downstream end of the channel (e.g. the gutter or flume). The depth d is typically the depth of water in the channel (e.g. the gutter or flume) measured sufficiently upstream of the waterwheel (or sufficiently upstream of the downstream end of the channel (e.g. gutter or flume)) that the depth measured is not substantially affected by the presence of the waterwheel or downstream end of the channel (e.g. gutter or flume), i.e. the depth is measured upstream of a region (the "drawdown region") in which the water level in the channel (e.g. gutter or flume) falls due to water flowing out of the channel (e.g. gutter or flume) and onto the waterwheel. For example, the depth d may be the depth of water in the channel (e.g. the gutter or flume) measured a distance approximately 4d upstream from the waterwheel (or from the downstream end of the channel (e.g. the gutter or flume)).

The method may comprise positioning the channel (e.g. the gutter or flume) such that the base of the channel (e.g. the gutter or flume) is at a (i.e. vertical) height of approximately 0.4D-0.4d above the bottom of the waterwheel. The method may comprise positioning the channel (e.g. the gutter or flume) such that the base of the channel (e.g. the gutter or flume) is at a (i.e. vertical) height of between 0.3D-0.5d and 0.5D-0.3d above the bottom of the waterwheel.

The method may further comprise: filtering the incoming water flow (for example, by way of a filter). Said filter may comprise a mesh, a grid and/or a net configured to restrict flow of debris, plants or animals (such as fish) from the incoming water flow onto the waterwheel. Such a filter would typically be configured to reduce (e.g. minimise) any effect on the flow speed or principal flow direction of the incoming water flow and/or to reduce (e.g. minimise) damage to wildlife.

The method may further comprise: configuring (e.g. positioning) the waterwheel such that a portion of the waterwheel is submerged (repeatedly, sequentially and/or continuously) in water (at the exit) as the waterwheel rotates. For example, the method may comprise: configuring (e.g. positioning) the waterwheel such that at least a portion of one or more paddles is submerged in water for at least a portion of the rotation cycle of the waterwheel about the axis.

The method may further comprise: directing water leaving the waterwheel (i.e. from the point of water exit from the waterwheel) away from said waterwheel in a downstream direction (for example, by way of a downstream water director such as a tailrace). The method may further comprise: configuring (e.g. positioning) the waterwheel such that a portion of the waterwheel is submerged (repeatedly, sequentially and/or continuously) in water (at the exit) in the tailrace as the waterwheel rotates.

The downstream water director (e.g. the tailrace) is typically configured to minimise back pressure on the waterwheel from water exiting the waterwheel. For example, a base of the tailrace may slope away from the waterwheel (in a downstream direction) such that water exiting the waterwheel flows (e.g. accelerates) (downstream) away from the waterwheel. The tailrace (e.g. side walls of the tailrace) may be configured to direct water exiting the waterwheel laterally (i.e. in a direction having a horizontal component perpendicular to the principal flow direction) away from the waterwheel. Accordingly, the method may further comprise: directing water leaving the waterwheel (i.e. from the point of water exit from the waterwheel) away from said waterwheel in a lateral direction. For example, the method may comprise: directing water leaving the waterwheel (from the point of water exit from the waterwheel) away from said waterwheel in a lateral direction at an angle of between 10° and 45° to the principal flow direction, or more typically at an angle of around 30° to said principal flow direction.

Alternatively, the waterwheel may be configured (e.g. positioned) such that none of the paddles is submerged in water (in the tailrace) during an entire rotation cycle of the waterwheel about the axis. Accordingly, the method may further comprise: supporting a significant portion of (e.g. the entirety of) the waterwheel above a water level at the point of water exit (e.g. in the tailrace). The method may comprise: supporting a significant portion of (e.g. the entirety of) each said paddle above a water level at the point of water exit (e.g. in the tailrace).

The method may further comprise: generating electricity by rotation of the waterwheel causing rotation of a rotor of an electricity generator. For example, the waterwheel may be mounted on a rotatable shaft or axle extending along the axis about which the waterwheel rotates. Rotation of the waterwheel about its axis may cause rotation of the rotatable shaft or axle. It may be that rotation of the rotatable shaft or axle causes rotation of the rotor, thereby driving the electricity generator. The electricity generator may convert kinetic energy of the rotating shaft or axle into electrical energy.

The waterwheel may be coupled to the electricity generator by way of a transmission and/or one or more gears (e.g. a gearbox).

It may be that the rotational speed of the waterwheel is (at least partially) dependent on (i.e. determined by, for example controlled by) the properties of the electricity generator (and/or the transmission and/or the one or more gears). It may be that the electricity generator (and/or the transmission and/or the one or more gears) controls (at least in part) the rotational speed of the waterwheel. It may be that the electricity generator (and/or the transmission and/or the one or more gears) has a braking effect on the waterwheel. It may be that the rotational speed of the waterwheel is controlled by varying a load of the electricity generator. It may be that the rotational speed of the waterwheel is controlled by varying the power output by the electricity generator. Accordingly, the method may further comprise: adjusting the load on the electricity generator, thereby controlling the rotational speed of the waterwheel.

It may be that the steps of the method are performed in the order disclosed herein. Alternatively, it may be that the steps of the method are performed in a different order than the order disclosed herein. It may be that the steps of the method are performed in any suitable order. In fact, it may be that any two or more of the steps of the method are performed simultaneously where possible.

Optional and preferred features described in relation to any one aspect of the invention are, mutatis mutandis, optional features of any other aspect of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
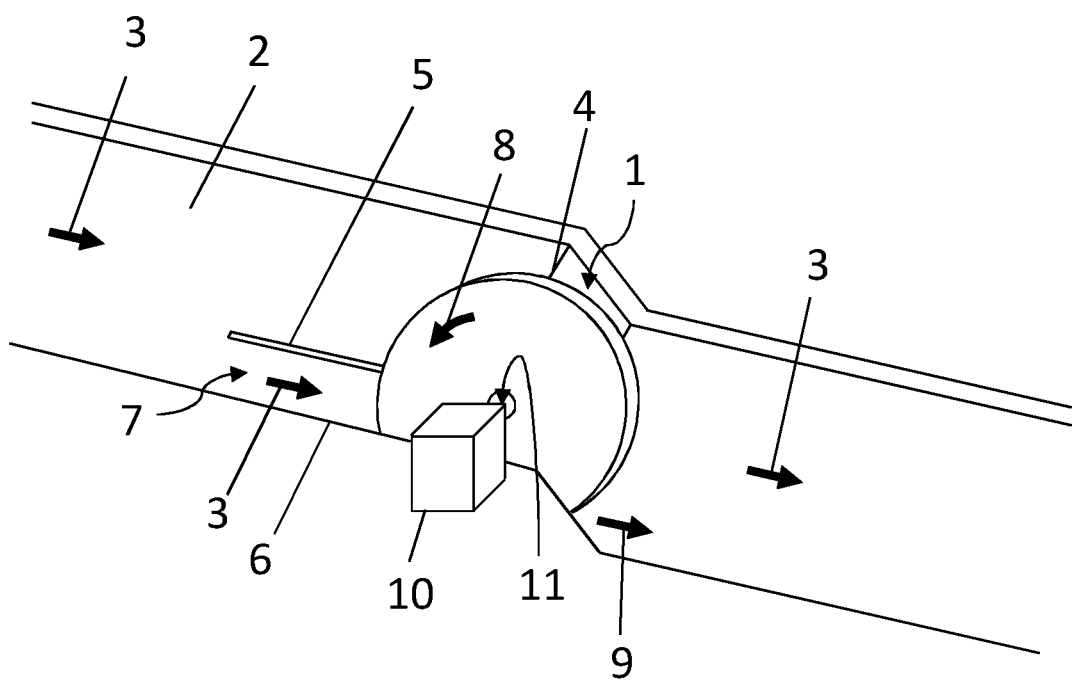
FIG. 1 is a perspective view of a waterwheel and an electricity generator together generating electricity from a flow of water in a river.

FIG. 1 shows a waterwheel 1 positioned in a river 2. The waterwheel 1 extracts energy from a flow of water in said river 2. The water in the river 2 flows downstream in a principal flow direction indicated by arrow 3, and over a weir 4. The principal flow direction 3 is substantially horizontal. The waterwheel 1 is positioned in the river 2 immediately downstream of the weir 4. A channel wall 5 is located in the river upstream of the weir 4 and the waterwheel 1. The channel wall 5 and an opposing river bank 6 together form a channel 7 which directs a portion of the water in the river 2 over the weir and onto the waterwheel in substantially horizontal direction 3. Water flowing onto the waterwheel causes said waterwheel to rotate in a sense indicated by arrow 8. As waterwheel 1 rotates, water which has flowed from the channel, over the weir, and onto the waterwheel is carried part of the way around the waterwheel and exits the waterwheel below the weir 4. The flow of water exiting the waterwheel is indicated by arrow 9. The flow of water 9 exiting the waterwheel 1 joints the rest of the river water flowing in direction 3.

The waterwheel 1 is coupled to an electricity generator 10 by way of an axle 11. As the waterwheel 1 rotates, rotation of the axle 11 drives rotation of a rotor (not shown) of the electricity generator 10, thereby generating electricity.

Figure 2:
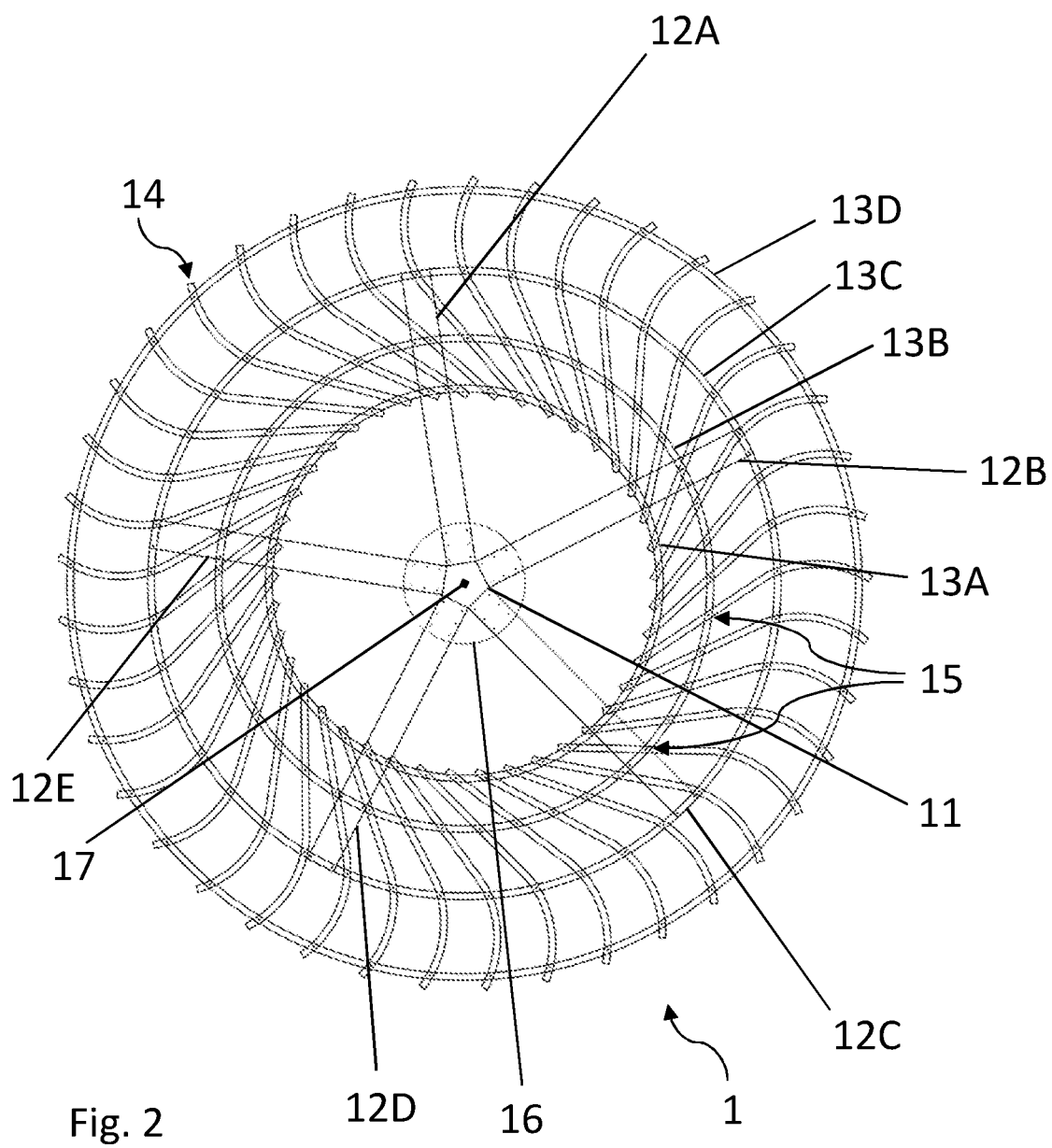
FIG. 2 is a side view of the waterwheel of FIG. 1.

FIG. 2 is a side view of the waterwheel 1. A skeletal structure of the waterwheel 1 is formed from five spokes 12A,12B,12C,12D,12E, which extend radially from the central axle 11, and three concentric ring elements 13A,13B, 13C fixedly attached to each of the five spokes 12A,12B, 12C,12D,12E by a plurality of bolts 15. The five spokes 12A,12B,12C,12D,12E are also fixedly attached to a supporting steel hub plate 16 by bolts 15. The concentric ring elements 13A,13B,13C each have a circular cross section as shown in FIG. 2.

A plurality of substantially identical waterwheel paddles 14 are fixedly attached to each of the ring elements 13A, 13B,13C by further bolts 15. The paddles 14 are arranged periodically around the central axle and extend longitudinally in an approximately radial direction away from central axle 11. The paddles 14 are spaced equally apart from one another around the circumference of each ring element 13A,13B,13C. An outer ring element 13D is also fixedly attached to each of the paddles by further bolts 15. The outer ring element is not fixed directly to the spokes 12A,12B, 12C,12D,12E. The waterwheel 1 is rotatable about an axis 17 extending parallel to and through the centre of axle 11.

Figure 3:
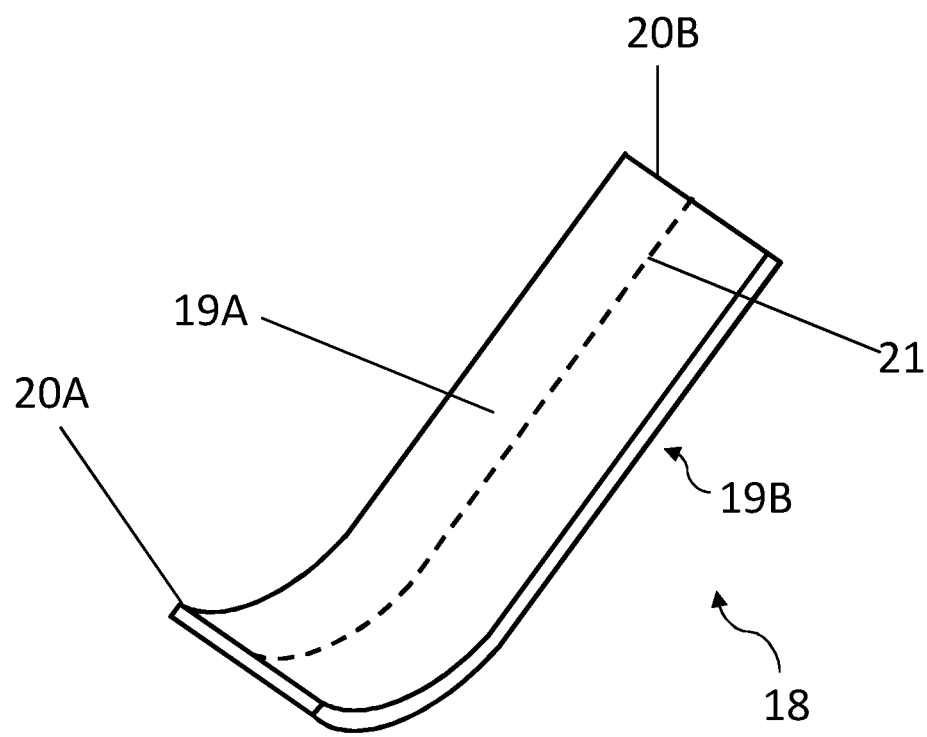
FIG. 3 is a perspective view of a paddle from the waterwheel of FIG. 1 and FIG. 2.
Figure 4:
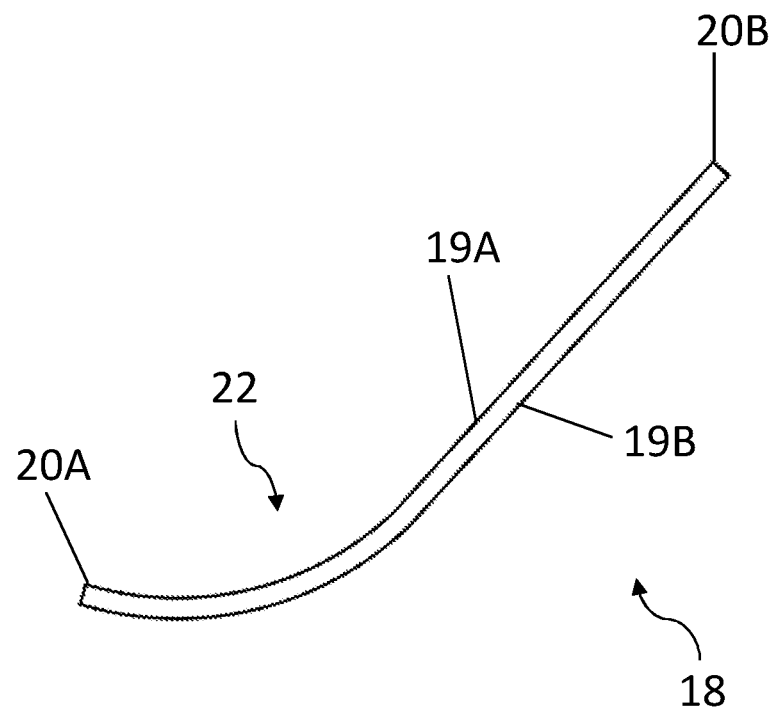
FIG. 4 is a side view of the paddle of FIG. 3.

FIGS. 3 and 4 show an example paddle 18 from the plurality of paddles 14. Paddle 18 consists of a curved wooden plank having uniform thickness, although it will be appreciated that any suitable material could be used. Paddle 18 comprises a water receiving surface 19A and an underside 19B opposite said water receiving surface. Paddle 18 extends between a first end 20A and a second end 20B. A longitudinal axis 21 of the paddle 18 passes through the centre of the paddle between the first end and the second end. The paddle 18 is generally symmetric about said longitudinal axis. A portion 22 of the paddle 18 is curved along said longitudinal axis. Said curved portion 22 extends from the first end of the paddle to a point intermediate the first end and the second end.

Figure 5:
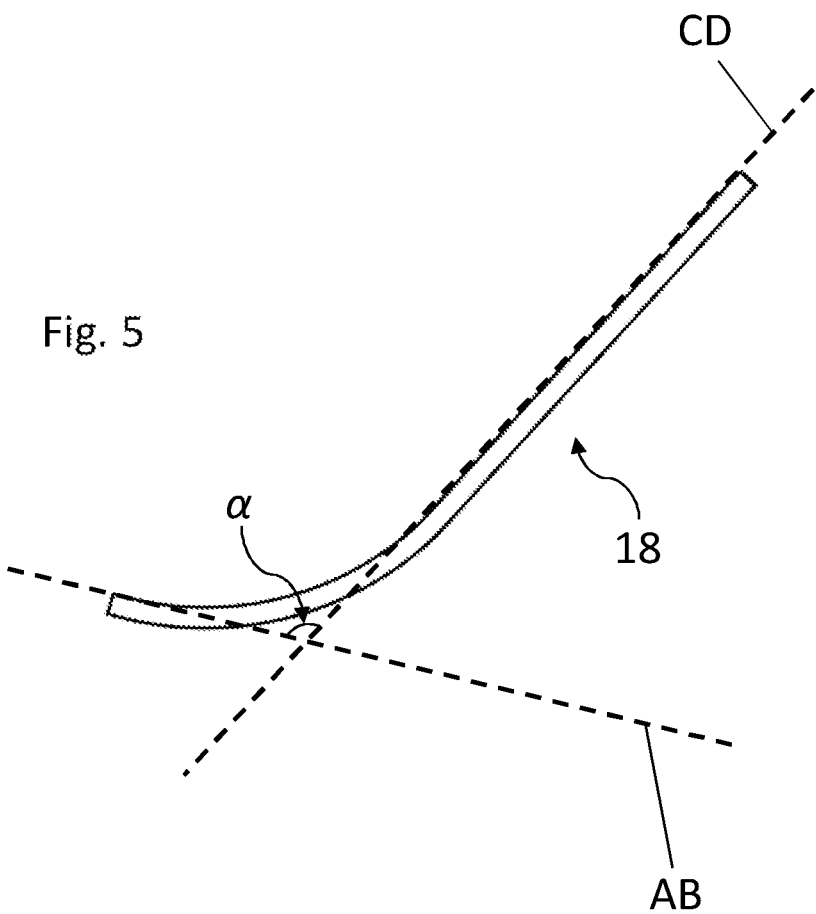
FIG. 5 is the side view of FIG. 4 with tangents to the upstream and downstream surfaces of the paddle indicated by dashed lines.

The curvature of the paddle 18 may be quantified by the angle through which the paddle curves between the first end 20A and the second end 20B, i.e the angle formed between an upstream portion of the water receiving surface at the first end and a downstream portion of the water receiving surface at the second end. As shown in FIG. 5, a tangent to the water receiving surface at the first end (indicated by line segment AB) and a tangent to the water receiving surface at the second end (indicated by line segment CD) intersect at an obtuse angle α (formed between the upstream and downstream portions of the water receiving surface) of approximately 120°.

Each of the plurality of paddles 14 are arranged around the waterwheel 1 such that the distance between the first end 20A of each paddle and the axle 11 is greater than the distance between the corresponding second end 20B and the axle 11. Accordingly, water entering the waterwheel by crossing the circumference of the waterwheel (i.e. by flowing past outer ring element 13D) typically flows initially over the first end of a respective paddle. The plurality of paddles 14 are also arranged periodically around the waterwheel 1 such that the water receiving surface 19A of each of the paddles faces the underside 19B of another of the paddles.

Figure 6:
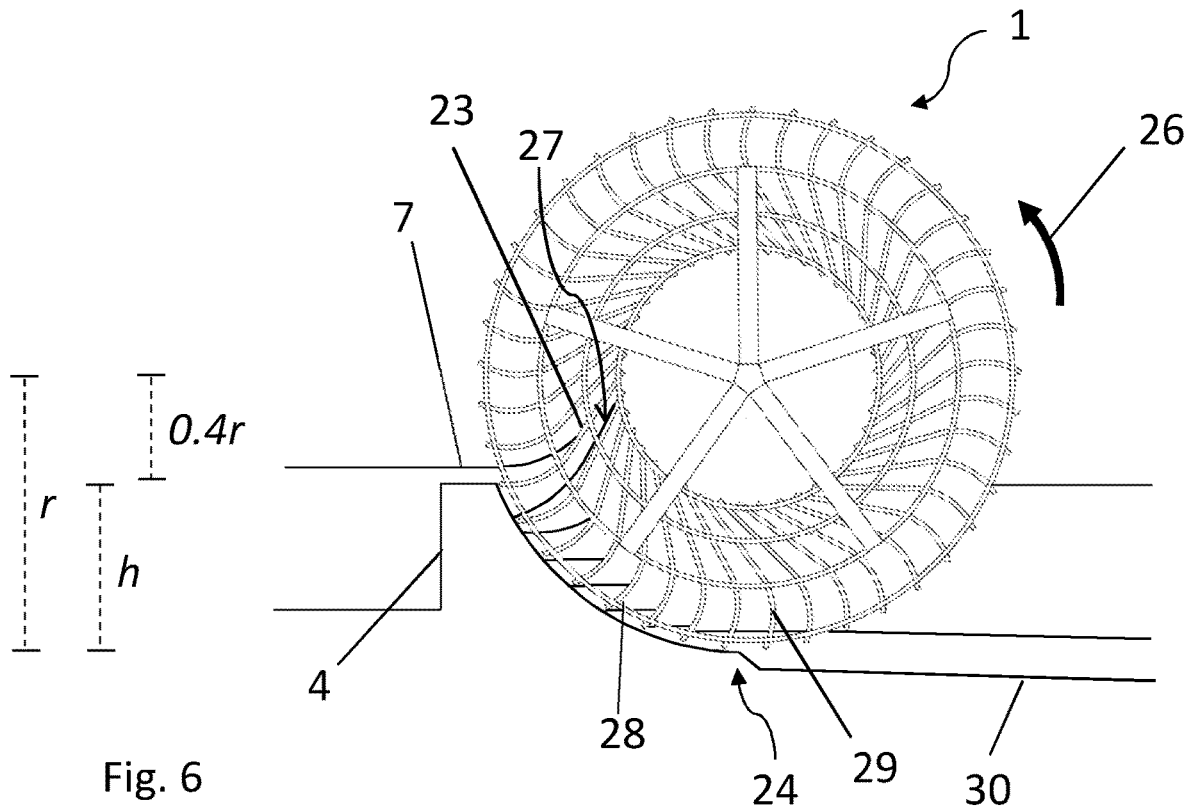
FIG. 6 is a cross section through the waterwheel apparatus of FIG. 1.
Figure 7:
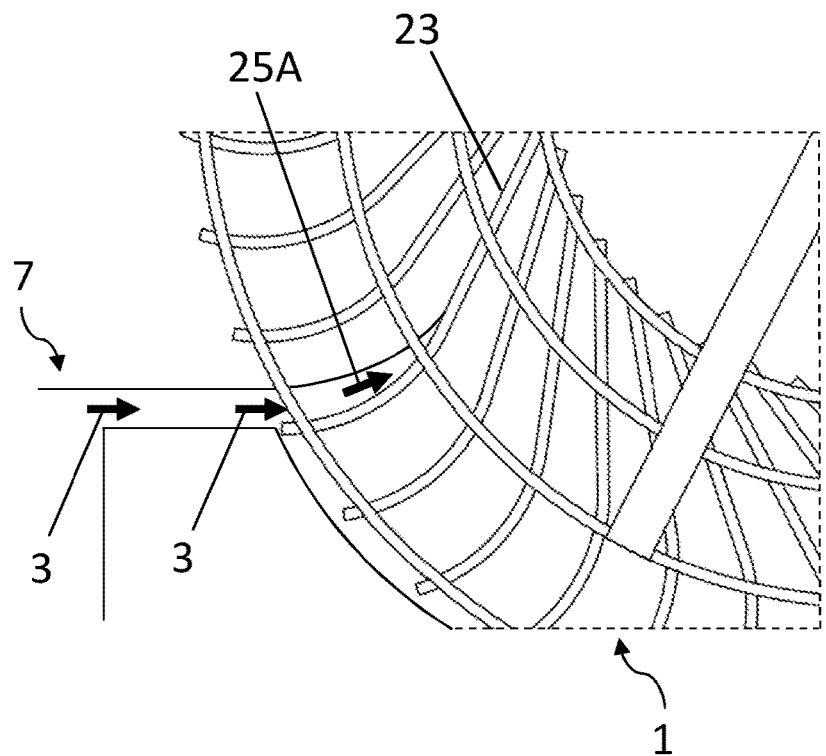
FIG. 7 is an expanded view of a portion of FIG. 6.

The mechanism by which flow of water from the river 2 onto the waterwheel 1 drives rotation of said waterwheel 1 is illustrated in FIGS. 6, 7, 8, 9 and 10. FIG. 6 shows a cross section through the waterwheel 1 in use in the river 2 immediately downstream of the weir 4. Water in the channel 7 flows over the weir 4 and onto a paddle 23 as the waterwheel rotates. Water flowing onto each paddle flows sequentially across the first end of said paddle and then onto and across at least a portion of the water receiving surface of said paddle from the first end towards the second end, as shown in more detail in FIG. 7.

Figure 8:
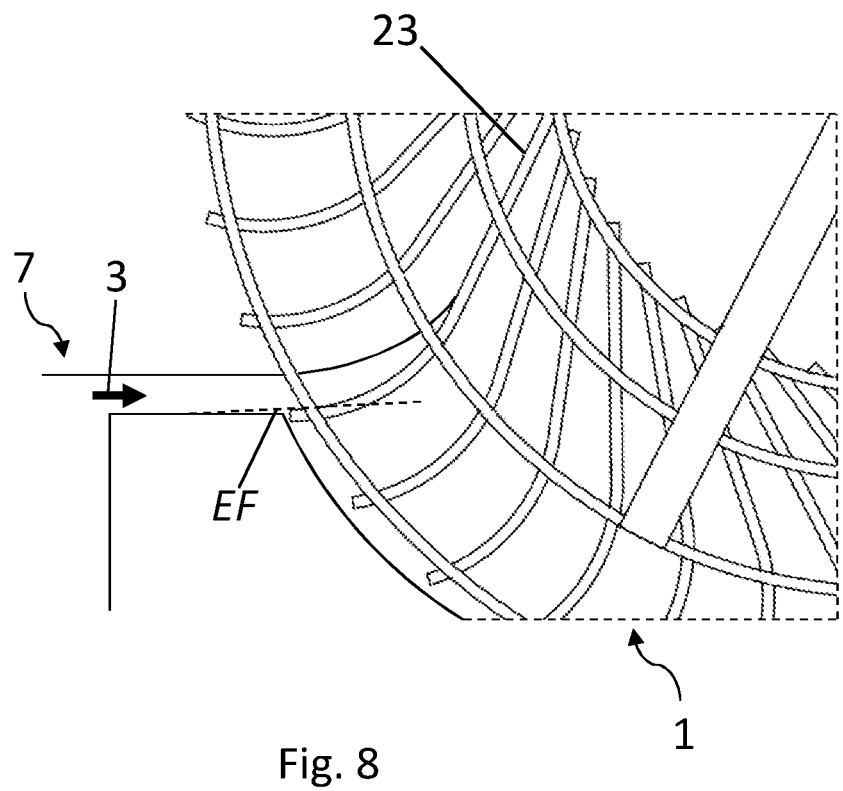
FIG. 8 in an alternative expanded view of the portion of FIG. 6 shown in FIG. 7.
Figure 9:
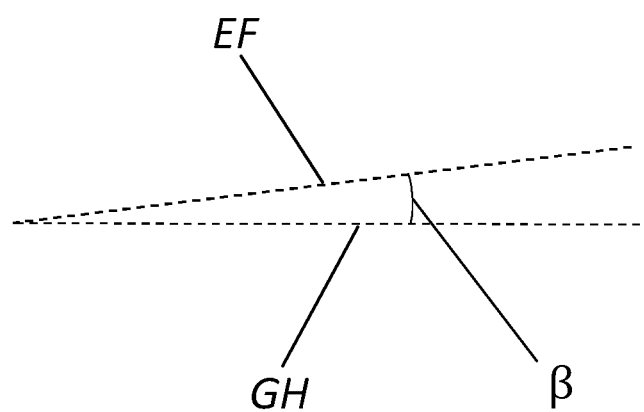
FIG. 9 is a schematic illustration of the geometry of the alternative expanded view of FIG. 8.

Paddle 23 is oriented with respect to the principal flow direction 3 of the incoming water flow such that the direction of water flow does not change significantly as water flows across the first end of the paddle 23 and onto the water receiving surface. More specifically, a tangent (indicated by line segment EF as shown in FIGS. 8 and 9) to the water receiving surface at the first end of paddle 23 intersects the flow direction 3 (indicated by line segment GH as shown in FIG. 9) of water in the channel 7 at an angle β having a value of approximately 10° during the portion of the rotation cycle of paddle 23 around the waterwheel shown in FIG. 6. Since angle β is small, water flowing over the weir and onto the water receiving surface is not deflected significantly away from the principal flow direction 3. Water therefore flows onto the paddle across the first end in a substantially horizontal direction.

In general, the value of the angle β between the tangent to the water receiving surface at the first end of the paddle and the flow direction will vary throughout a water receiving portion of the rotation cycle of the paddle around the waterwheel (i.e. the portion of the rotation cycle in which the said paddle is in communication with the incoming flow of water). The inventors have found that deflection of the flow of water onto the paddle can be reduced by restricting the value off achieved during at least a portion of the (and preferably the entire) water receiving portion of the rotation cycle of the paddle.

If the water receiving surface of the paddle 23 faces upstream during the water receiving portion of the rotation cycle for said paddle (such that a normal to the water receiving surface at the first end extends away from said water receiving surface in a direction having a positive component in an upstream direction), as shown in the example configuration of FIG. 6, flow of water onto the paddle is not deflected significantly if the value of β is less than a maximum of 35° during at least a portion of said water receiving portion of the rotation cycle (and preferably during the entire water receiving portion).

Alternatively, if the water receiving surface of the paddle 23 faces downstream during the water receiving portion of the rotation cycle for said paddle (such that the normal to the water receiving surface at the first end extends away from said water receiving surface in a direction having a positive component in a downstream direction), flow of water onto the paddle is not deflected significantly if the value of β is less than a maximum of 10° during at least a portion of said water receiving portion of the rotation cycle (and preferably during the entire water receiving portion).

Nevertheless, values of β substantially lower than than 35° (when the water receiving surface of the paddle faces upstream) or substantially lower than 10° (when the water receiving surface of the paddle faces downstream) cause even less deflection of the incoming water flow and it is therefore typically preferable to achieve a value of β of approximately 0° during at least a portion of the time that the paddle is in communication with the incoming water flow.

As shown in FIG. 6, water flows onto the waterwheel 1 at a vertical height h above a bottom of the waterwheel 24 (i.e. a point of water exit from the waterwheel). The circular cross section of the waterwheel 1 is defined by an outer radius r, as shown in FIG. 6, which extends between the centre of the axle 11 and the first ends of each of the paddles 14. Accordingly, the height at which water flows onto the waterwheel 1 can be defined as being r–h vertically below the height of the axle 11. As shown in FIG. 6, the height at which water flows onto the waterwheel 1 from the channel 7 is 0.4r vertically below the height of the axle 11 in the present example embodiment. In general, heights of water entry between 0.5r either vertically above or vertically below the height of the axle 11 are possible.

As water flows across each paddle, weight of the water exerts a force on the paddle due to gravity. The weight of the water always acts vertically downwards. Due to the shape and the orientation of each paddle, the resultant force on each paddle due to the weight of the carried water acts in a generally downwards direction having a non-zero component in the downstream direction. In addition, water flowing across the water receiving surface from the first end towards the second end of each paddle changes flow direction, as indicated by arrow 25A, due to the curvature of the water receiving surface. Accordingly, the velocity (being a vector quantity), and hence also the momentum, of the water is changed as it flows across the curved water receiving surface. In this process, momentum is transferred from the water to the paddle. The flow of water changing flow direction therefore exerts an additional force on the paddle, due to the transfer of momentum, acting in a direction perpendicular to the water receiving surface. Both the weight of the water acting on the paddle and the force arising due to the change in the flow direction of water flowing across the water receiving surface act in a direction which causes the waterwheel to rotate in the sense indicated by arrow 26. Accordingly, as the waterwheel rotates, it extracts both gravitational potential energy and kinetic energy from the flow of water. Gravitational potential energy is extracted from the water as the vertical height of the water is lowered as the waterwheel rotates. Kinetic energy is extracted from the flow of water as said flow is deflected from its principal flow direction 3 into a new flow direction 25A.

As the waterwheel 1 rotates about its axle 11 due to the forces exerted on the paddles as described above, each paddle in communication with the flow of water over the weir is lowered out of communication with said flow and a subsequent paddle is brought into communication with said flow of water. As each paddle is substantially identical, water will flow over the weir and onto each subsequent paddle, thereby exerting a force on each subsequent paddle causing the waterwheel 1 to continue to rotate. Continued rotation of the waterwheel 1 brings each of the paddles 14 sequentially into and out of communication with the flow of water. Each of the plurality of paddles 14 remains in communication with the flow of water for its respective water receiving portion of the rotation cycle of the waterwheel 1 about its axle 11.

As can be seen with regard to, for example, paddle 27 in FIG. 6, as the waterwheel 1 rotates, water which has flowed from the channel 7 onto any of the paddles 14 continues to move across the water receiving surface of each said paddle after said paddle has rotated out of its respective water receiving portion of the rotation cycle of the waterwheel 1. Water continues to flow upwards across the water receiving surface of each said paddle towards the second end of said paddle until the flow has decelerated to a zero flow speed relative to the water receiving surface of the paddle. Water then flows back down said paddle in an upstream direction towards the first end under gravity.

Figure 10:
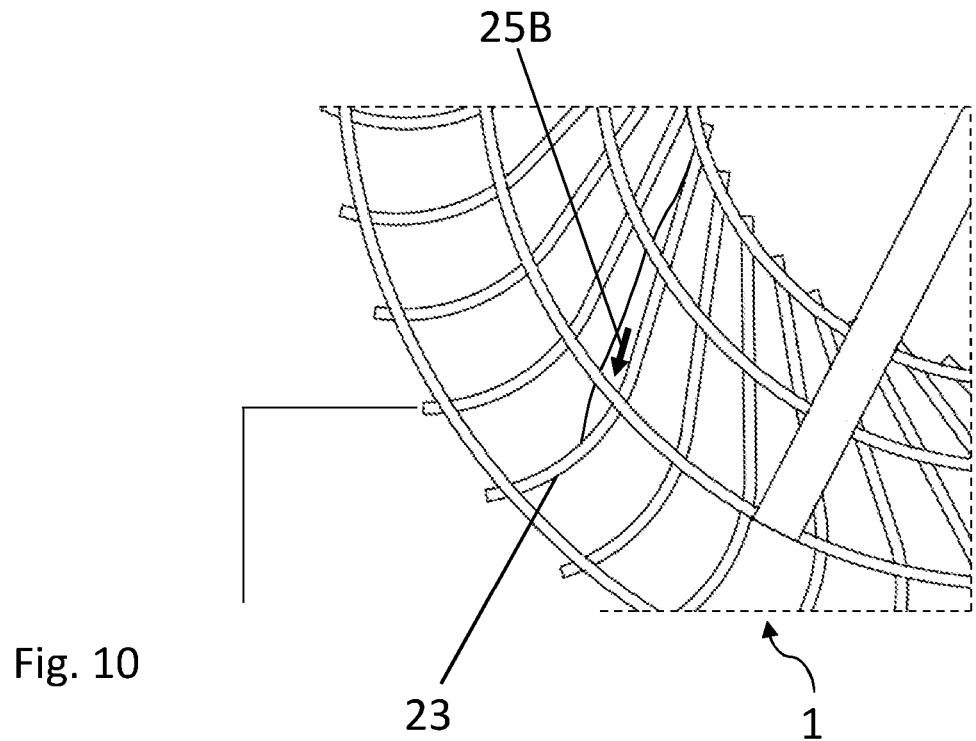
FIG. 10 is an expanded view of an alternative portion of FIG. 6.

The water flow back down paddle 23, in the direction indicated by arrow 25B, as the waterwheel rotates is illustrated in FIG. 10 (in which the waterwheel has rotated out of the configuration shown in FIG. 6). As the water flows back down the paddle, the water again changes flow direction due to the curvature of the paddle and thereby transfers additional momentum to the paddle.

Water flows back and forth across the water receiving surface of each paddle several times before settling to an approximately constant level. For example, as seen in FIG. 6, paddle 28 has rotated approximately one eighth of the way through its rotation cycle about the axle 11. By this point, the level of the water on the water receiving surface of paddle 28 has approximately settled and continues to exert a force on paddle 28 principally due to gravity. By this point in the rotation cycle, the water on the water receiving surface of paddle 28 is still moving (through space) as the waterwheel 1 rotates, but said water moves with substantially the same speed as the paddle 28, so that further kinetic energy is not transferred from the water to the paddle 28.

As shown in FIG. 6, paddle 29 has rotated approximately one further eighth of the way through its rotation cycle about the axle 11 than paddle 28. By this point in the rotation cycle, the paddle 29 no longer retains any water within the waterwheel. The water retained by the paddle 29 flowed out of the waterwheel 1 when the paddle 29 rotated past the point of water exit 24. Water flows out of the waterwheel at the point of water exit 24 into a tailrace 30.

In this example embodiment of the invention, a portion of the waterwheel, including a portion of the paddles, is submerged beneath the flow of water in the tailrace at the point of water exit. Nevertheless, because the tailrace slopes away from the point of water exit in the downstream direction and because water exiting the waterwheel travels in the downstream direction with substantially the same speed as the tangential speed of the first end of each paddle at the point of water exit, water in the tailrace 30 does not exert a significant back pressure on the paddles. Water in the tailrace flows downstream away from the waterwheel and joins the rest of the flow of water in the river downstream of the weir.

Waterwheel 1 is coupled to the electricity generator 10 by way of axle 11, and rotation of the axle 11 drives rotation of a rotor of the electricity generator 10, thereby generating electricity. The combined apparatus of the waterwheel 1 coupled to the electricity generator 10 therefore converts a portion of the gravitational potential energy and a portion of the kinetic energy of the river 2 into electrical energy. The maximum amount of energy which can be extracted from the flow of water from the river 2 is determined in part by the vertical height difference h between the height at which water flows from the channel 7 onto the waterwheel 1 and the point of exit 24. The greater the height difference h, the greater the gravitational potential energy which can be extracted from the water. Similarly, the maximum amount of energy which can be extracted from the flow of water from the river 2 is also determined by the flow speed v of the river 2. The greater the flow speed v, the greater the kinetic energy of the river 2 which can be extracted.

The rotation of the waterwheel is generally controlled such that each of the paddles 14, onto which river water flows, during the water receiving portion of the rotation cycle for each said paddle, rotates away from the point of water entry with a speed in the principal flow direction 3 that is less than the flow speed v of the water in said direction. Because the flow of water in the principal flow direction 3 is faster than the speed at which the paddle rotates away from the point of water entry in said same direction 3, water flows onto and across each paddle. Because the curvature of each paddle causes a flow of water thereacross to change direction, kinetic energy is extracted from the flow of water. In addition, because the first end of each paddle does not significantly deflect or disrupt the flow of water onto the paddle in the principal flow direction, any waste of kinetic energy as the flow of water flows onto each paddle is reduced, and the proportion of kinetic energy in the water available to be extracted by the waterwheel is increased.

The speed at which the waterwheel rotates is determined, at least in part, by the physical properties of the waterwheel itself, any transmission or system of gears (as is generally known) used to couple the waterwheel via the axle to the electricity generator, and by a load of the electricity generator. The inventors have found that use of a variable load electricity generator (such as the Keypower HYDRO-WATT AC generator) is particularly useful for setting the speed of rotation of the waterwheel. In particular, the inventors have found that restricting the speed of rotation of the waterwheel to between 1.5 rpm and 2.5 rpm enhances the efficiency of the waterwheel.

Further variations and modification may be made within the scope of the invention herein disclosed.

Figure 11:
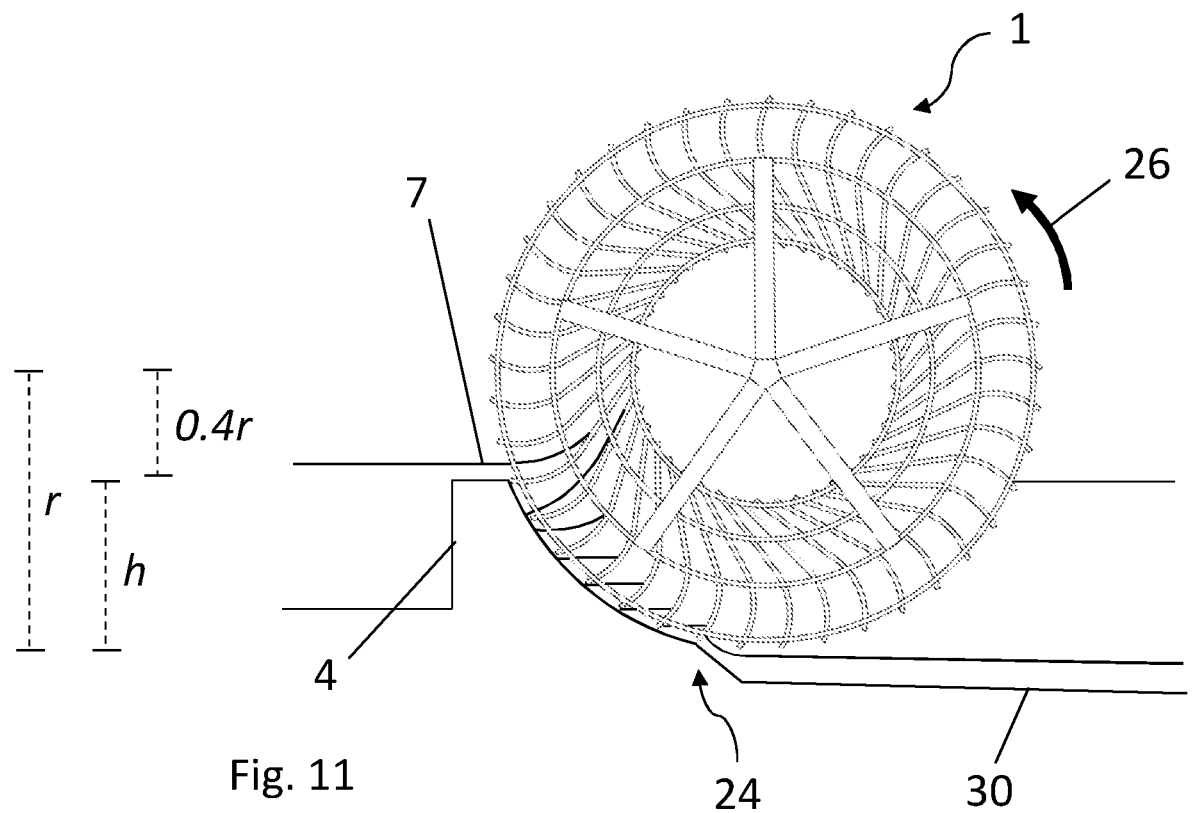
FIG. 11 is a cross section through an alternative example embodiment waterwheel apparatus.

For example, FIG. 11, shows a waterwheel supported within a wheelpit above the base of a tailrace such that no portions of the waterwheel (including the paddles) are submerged beneath the flow of water in the tailrace during the entire rotation cycle of the waterwheel about the axle. In such an embodiment, any potential back pressure on the paddles from fast-flowing water in the tailrace is eliminated, thereby further reducing any waste of kinetic energy and potentially increasing the efficiency of the waterwheel. Water exiting the waterwheel merely falls vertically downwards out of the waterwheel into the tailrace. However, the vertical height difference between the point of water entry and the point of water exit is reduced in such an embodiment such that the maximum quantity of gravitational potential energy which may be extracted from the flow of water is also reduced, thereby potentially decreasing the efficiency of the waterwheel. The preferred configuration of the waterwheel and the tailrace would therefore generally depend on the specific details of any implementation, including the available head differences and the flow speed of the source of water.

Figure 12:
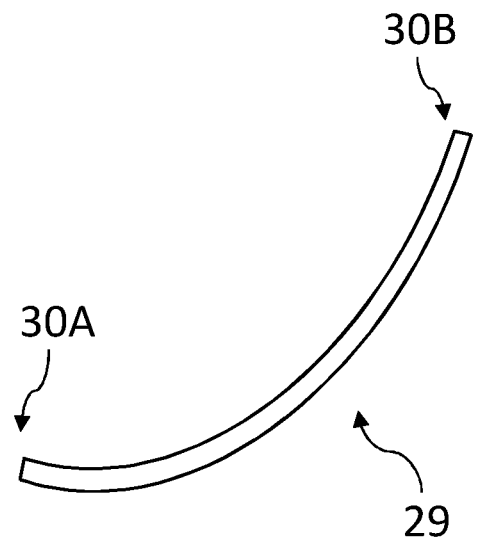
FIG. 12 is a side view of an alternative paddle design.
Figure 13:
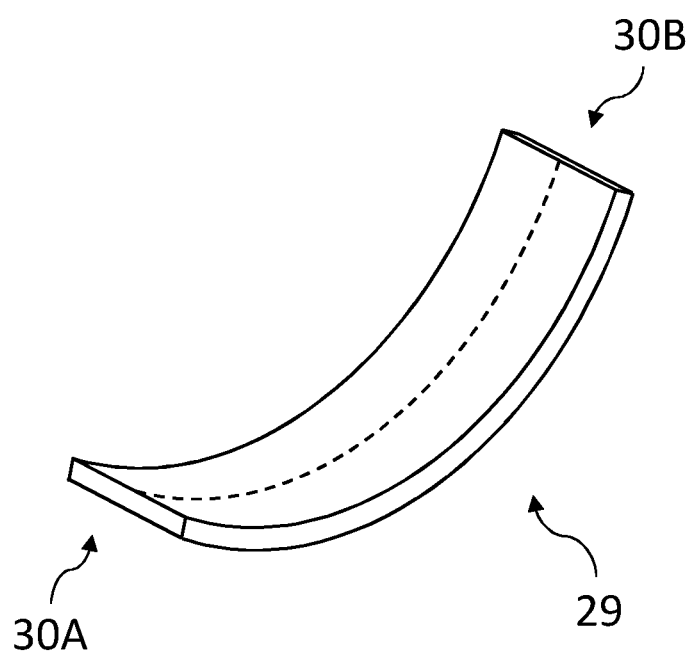
FIG. 13 is a perspective view of the paddle of FIG. 11.

FIGS. 12 and 13 show an alternatively shaped paddle 29 which is curved along its entire length from a first end 30A to a second end 30B. Different paddle curvatures are also possible.

Figure 14:
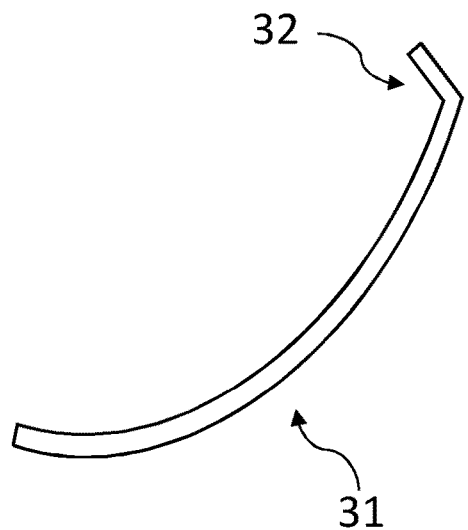
FIG. 14 is a side view of a second alternative paddle design.

FIG. 14 shows a variant 31 of paddle 29. A paddle cell wall 32 extends from the second end of paddle 31. The dimensions and orientation of the paddle cell wall 32 may be selected such that, in use, the paddle cell wall 32 extends between said paddle 31 and an underside of another adjacent paddle on the waterwheel, thereby enclosing a space between the water receiving surface of the paddle 31 and the underside of the adjacent paddle and thus forming a partially enclosed paddle cell. The paddle cell wall 32 typically restricts or prevents water from flowing in the downstream direction over the second end of the paddle 31 and therefore escaping from said paddle.

Each paddle may be formed from one plank. Additionally or alternatively, each paddles may be formed from two or more connected planks. Each paddle may be formed from one or more sheets (e.g. one or more metal sheets).

Different paddle thicknesses are also possible. For example, the thickness of each paddle may not be uniform along its length. In addition, each paddle may be made from any suitable material including wood or metal.

The arrangement of the plurality of paddles around the waterwheel may be varied. For example, the spacing between paddles may be varied. The value of angle β between the tangent to the water receiving surface of each paddle in communication with water flowing over the weir and the principal flow direction may be varied. Such an angle β is, however, typically small (i.e. typically between 0° and 35°).

It has been found that the waterwheel is able to handle larger volumetric flow rates of water when the straight line distance between the first end of each paddle and the first end of each adjacent paddle (i.e. the spacing between immediately adjacent paddles) is greater than 0.6 metres, or more preferably greater than 0.8 metres. Increasing the spacing between the paddles reduces the amount of paddle material and increases the amount of space in each paddle cell which may be filled with water. This means the waterwheel can typically handle larger volumetric flow rates of water than known breastshot waterwheels having similar dimensions. This increases the amount of power which can be generated by the waterwheel, and reduces materials and construction costs since a narrower waterwheel of the present invention can be used to extract energy from the same volumetric flows as a wider (and therefore more expensive) waterwheel based on known breastshot waterwheel designs. This also makes the waterwheel more suitable for use with faster flowing incoming water flows (such as faster flowing rivers). It has, however, also been found that it is preferable for the spacing between adjacent paddles to be less than 1.4 metres, otherwise the efficiency of the waterwheel is reduced. Accordingly, assuming that the paddles are spaced out evenly around the waterwheel, the total number of paddles is preferably between around Dπ/0.6 (i.e. rounded to the nearest whole number) and around Dπ/1.4 (i.e. rounded to the nearest whole number), where D is the diameter of the waterwheel measured in metres.

Other configurations and positions of the waterwheel relative to a source of flowing water are also possible. For example, a gutter or flume may be used to direct water from the river onto the waterwheel. Alternatively, the waterwheel may be positioned in a river bed such that water flows directly from the river onto the waterwheel. The waterwheel may be positioned adjacent to a bank of the river, or it may be positioned in the middle of a river spaced apart from either bank. The waterwheel may also be placed in or adjacent to a canal or a stream or any other flow of water other than a river.

Figure 15:
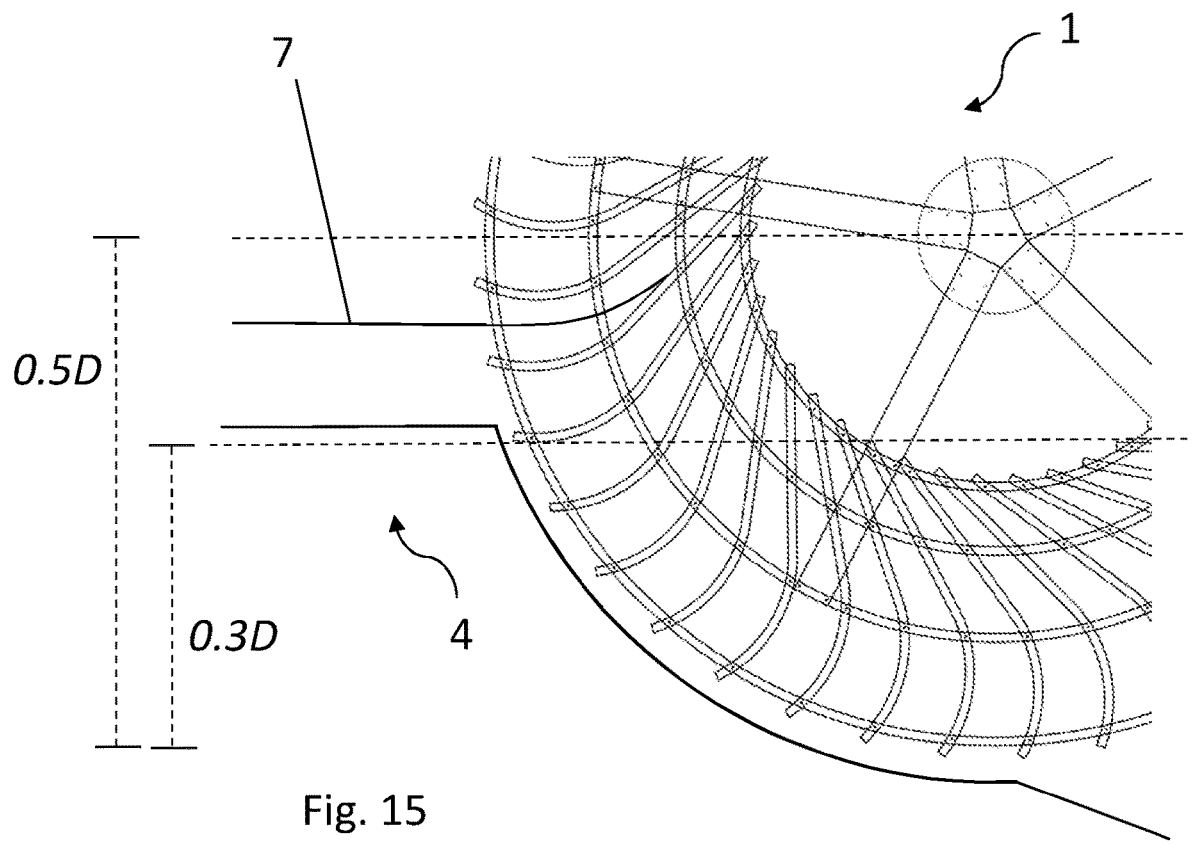
FIG. 15 is a cross section through an example embodiment waterwheel.

It has been found that the efficiency of the waterwheel is increased when water flows onto the waterwheel at a height of between 0.3D and 0.5D above the base (or the bottom) of the waterwheel, where D is the diameter of the waterwheel (i.e. D=2r), for example when the water flows onto the waterwheel at a height of approximately 0.4D above the base of the waterwheel. The boundaries of this optimal region are indicated by dashed lines in FIG. 15.

Figure 16:
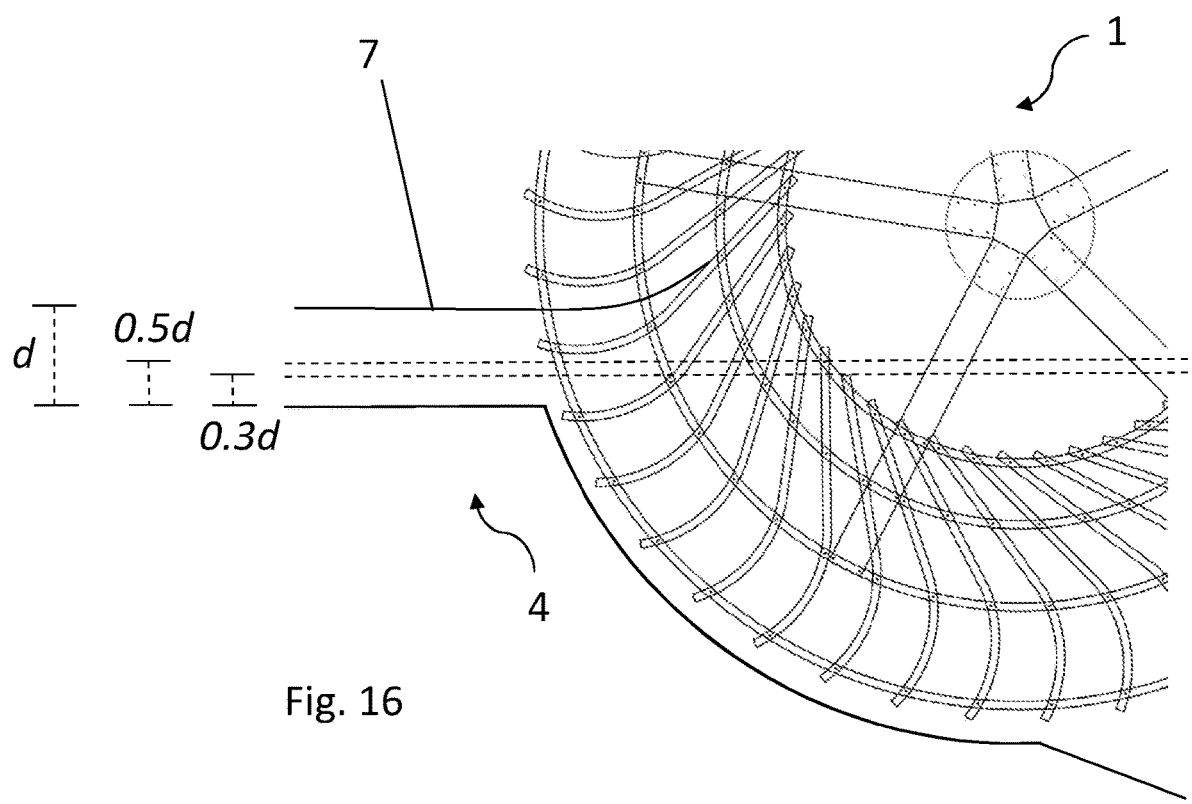
FIG. 16 is another cross section through an example embodiment waterwheel.

It has also been found that the efficiency of the waterwheel is increased when the gutter or flume is positioned such that between 30% and 50% of the volume of water in the said gutter or flume is below the said height of between 0.3D and 0.5D above the base of the waterwheel, and the remaining volume of water in the gutter or flume is above the said height of between 0.3D and 0.5D above the base of the waterwheel. When the gutter or flume has a substantially rectangular cross section (i.e. perpendicular to the principal flow direction), this corresponds to positioning the gutter or flume such that a level in the gutter or flume which is between 0.3d and 0.5d above the base of the flume is aligned within the 0.3D to 0.5D range (e.g. is provided at a height of 0.4D) above the base of the waterwheel, where d is the depth of the water in the flume. The boundaries of this optimal region are indicated by dashed lines in FIG. 16. Accordingly, the efficiency of the waterwheel is typically increased when the base of the gutter or flume is positioned at a height of between 0.3D-0.5d and 0.5D-0.3d above the base of the waterwheel.

Figure 17:
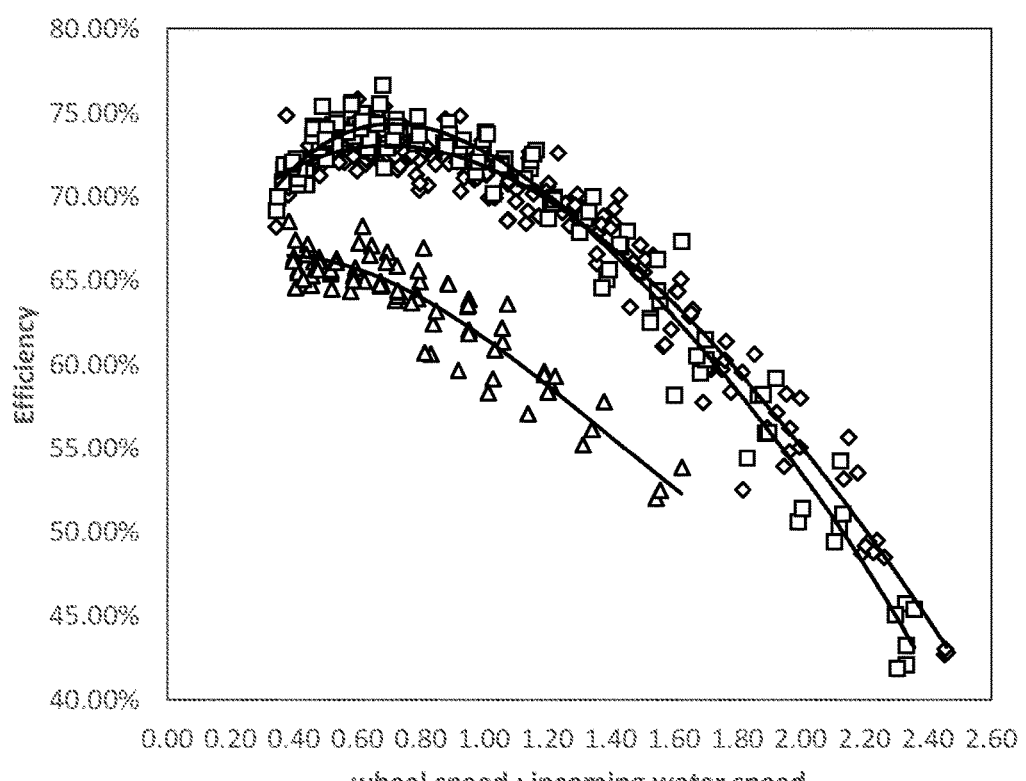
FIG. 17 is a graph of the efficiency of an example embodiment waterwheel as a function of the ratio of the magnitude of the tangential velocity of the first ends of the paddles, as the waterwheel rotates in use, to the speed of the incoming water flow.

FIG. 17 shows the efficiency of a model waterwheel according to the present invention as measured experimentally as a function of the ratio of the magnitude of the tangential velocity of the first ends of the paddles to the incoming water speed. Three sets of data (shown using triangles, squares and diamonds) represent tests carried out using different volume flow rates of water through the waterwheel (and accordingly different depths d of water in the flume). The height at which water flowed onto the waterwheel was the same in each case. Polynomial curves have been fitted to the experimental data. As can be seen, in each case, the efficiency goes through a maximum value below a ratio of 1, and decreases rapidly as the ratio increases above 1. These results can be explained as follows. When the ratio is greater than 1, water leaves the wheel at the speed of the first ends of the paddles, which is greater than the incoming water flow speed, and so the waterwheel only extracts potential energy from the incoming water flow and does not extract kinetic energy. Below a ratio of 1, the waterwheel extracts both kinetic energy and potential energy from the incoming water flow because the incoming water flow is slowed down as it travels through the wheel. Below a ratio of between around 0.6 to 0.8 (depending on the wheel dimensions and volume flow rate), the efficiency decreases again due to water flowing over the second ends of the paddles and into the centre of the wheel, and due to some of the incoming water failing to enter the wheel as each paddle cell rapidly fills up with water. The results show that extracting kinetic energy from the incoming water flow, in addition to extracting potential energy, results in an overall increase in the efficiency which can be achieved. This stands in contrast to conventional breastshot waterwheels which are typically designed or operated to avoid extraction of kinetic energy from the incoming water flow, in order to avoid what are believed to be turbulent losses as water flows onto the waterwheel.

The invention claimed is:

1. A waterwheel configured to extract energy from an incoming water flow, the waterwheel being rotatable about an axis and comprising a plurality of paddles, each of the said paddles being in communication with the incoming water flow for a respective water receiving portion of a rotation cycle of the waterwheel about the axis, wherein, during the water receiving portion of the rotation cycle for a said paddle, the incoming water flow flows onto a water receiving surface of the paddle, the water receiving surface extending between first and second ends of the paddle, the first end being upstream of the second end and being configured such that, during at least a portion of said water receiving portion of the rotation cycle for said paddle, the incoming water flow flows in a substantially horizontal direction across said first end of the paddle onto an upstream portion of the water receiving surface such that an angle between a principal flow direction of the incoming water flow and a horizontal plane is less than 10 degrees, wherein at least a portion of the incoming water flow received by the upstream portion of the water receiving surface flows from the upstream portion onto a downstream portion of said water receiving surface thereby changing direction and exerting a force on the paddle causing the waterwheel to rotate about the said axis in a rotational direction, and wherein the waterwheel is a breastshot waterwheel and is configured to rotate about said axis in said rotational direction such that a magnitude of a tangential velocity of the first end of the said paddle is less than a speed of the incoming water flow flowing across the said first end of the paddle during the water receiving portion of the rotation cycle for the said paddle.

2. The waterwheel according to claim 1, wherein, during at least a portion of the water receiving portion of the rotation cycle for said paddle, an angle between a principal flow direction of the incoming water flow and a tangent to the water receiving surface at the first end of said paddle, said tangent being in a plane of rotation of the waterwheel about said axis, is less than 35°.

3. The waterwheel according to claim 2, wherein, during at least a portion of the water receiving portion of the rotation cycle for said paddle, the water receiving surface at the first end of said paddle faces downstream and the angle between the principal flow direction of the incoming water flow and the tangent to the water receiving surface at the first end of said paddle is less than 10°, and/or, during at least a portion of the water receiving portion of the rotation cycle for said paddle, the water receiving surface at the first end of said paddle faces upstream and the angle between the principal flow direction of the substantially horizontal incoming water flow and the tangent to the water receiving surface at the first end of said paddle is less than 35°.

4. The waterwheel according to claim 1, wherein an angle between a tangent to the upstream portion of the water receiving surface of said paddle and a tangent to the downstream portion of the water receiving surface of said paddle, said angle being enclosed between said upstream and downstream portions of the water receiving surface, is less than 160°.

5. The waterwheel according to claim 1, wherein at least a portion of the water receiving surface of said paddle between the upstream portion and the downstream portion is curved in a or the plane of rotation of the waterwheel about said axis and/or wherein at least a portion of the water receiving surface of said paddle is concave.

6. The waterwheel according to claim 1, wherein a weight of water from the incoming water flow flowing on the water receiving surface of said paddle exerts a force on said paddle due to gravity, thereby causing the waterwheel to rotate in the said rotational direction.

7. The waterwheel according to claim 1, wherein the water receiving surface of said paddle is configured such that a flow of water thereacross is laminar.

8. The waterwheel according to claim 1, wherein the first end of the or each said paddle or paddles is positioned a distance r from the axis and a longitudinal length of the water receiving surface of said paddle is between $0.5r$ and $r$, and wherein the waterwheel is configured such that the incoming water flow flows onto the waterwheel at a height of between $0.5r$ below and $0.5r$ above the height of the axis.

9. The waterwheel according to claim 1, wherein a straight line distance between the first end of a or each paddle and the first end of a or each adjacent paddle is greater than 0.6 metres or wherein the total number of paddles of the waterwheel is less than $D\pi/0.6$, D being the diameter of the waterwheel measured in metres.

10. Waterwheel apparatus comprising the waterwheel according to claim 1 and a channel configured to direct the incoming water flow onto the waterwheel or wherein the apparatus further comprises a downstream water director configured to direct water exiting the waterwheel away from said waterwheel.

11. The waterwheel apparatus according to claim 1, further comprising an electricity generator coupled to the waterwheel such that rotation of the waterwheel causes the electricity generator to generate electricity.

12. The waterwheel apparatus according to claim 1, wherein the channel is configured such that a base of the said channel is at a height of between $0.3D - 0.5d$ and $0.5D - 0.3d$ above the bottom of the waterwheel, wherein D is the diameter of the waterwheel in metres and d is the depth of water in the channel in metres.

13. A method of extracting energy from an incoming water flow, the method comprising: providing a breastshot waterwheel in communication with the incoming water flow, the breastshot waterwheel comprising a plurality of paddles and rotating in a rotational direction about an axis such that each of the said paddles is brought into communication with the incoming water flow for a respective water receiving portion of a rotation cycle of the waterwheel about the said axis; during the water receiving portion of the rotation cycle for a said paddle, the incoming water flow flowing onto a water receiving surface of said paddle, said water receiving surface extending between first and second ends of said paddle, the first end being upstream of the second end; during at least a portion of said water receiving portion of the rotation cycle for said paddle, the incoming water flow flowing in a substantially horizontal direction across the first end of the paddle onto an upstream portion of the water receiving surface such that an angle between a principal flow direction of the incoming water flow and a horizontal plane is less than 10 degrees; and at least a portion of the incoming water flow received by the upstream portion of the water receiving surface of the said paddle flowing from the upstream portion onto a downstream portion of said water receiving surface of said paddle, thereby changing direction and exerting a force on said paddle causing the waterwheel to rotate in said rotational direction, wherein a magnitude of a tangential velocity of the first end of the said paddle is less than a speed of the incoming water flow flowing across the first end of the said paddle during the water receiving portion of the rotation cycle for the said paddle.

14. The method according to claim 13 further comprising: positioning the waterwheel relative to the incoming water flow such that, during at least a portion of the water receiving portion of the rotation cycle for said paddle, an angle between a principal flow direction of the incoming water flow and a tangent to the water receiving surface at the first end of said paddle, said tangent being in a plane of rotation of the waterwheel about said axis, is less than 35°.

15. The method according to claim 13 further comprising: positioning the waterwheel relative to the incoming water flow and configuring the waterwheel such that, during at least a portion of the water receiving portion of the rotation cycle for said paddle, the water receiving surface at the first end of said paddle faces downstream and the angle between the principal flow direction of the substantially horizontal incoming water flow and the tangent to the water receiving surface at the first end of said paddle is less than 10°, and/or, during at least a portion of the water receiving portion of the rotation cycle for said paddle, the water receiving surface at the first end of said paddle faces upstream and the angle between the principal flow direction of the substantially horizontal incoming water flow and the tangent to the water receiving surface at the first end of said paddle is less than 35°.

16. The method according to claim 13 wherein an angle between a tangent to the upstream portion of the water receiving surface of said paddle and a tangent to the downstream portion of the water receiving surface of said paddle, said angle being at least partially enclosed between said upstream and downstream portions of the water receiving surface, is less than 160°.

17. The method according to claim 13, wherein at least a portion of the water receiving surface of said paddle between the upstream portion and the downstream portion is curved in a or the plane of rotation of the waterwheel about said axis or wherein at least a portion of the water receiving surface of said paddle is concave.

18. The method according to claim 13 further comprising: a weight of water from the incoming water flow flowing on the water receiving surface of said paddle exerting a force on said paddle due to gravity, thereby causing the waterwheel to rotate in the said rotational direction.

19. The method according to claim 13, wherein the water receiving surface of said paddle is configured such that a flow of water thereacross is laminar.

20. The method according to claim 13, wherein the first end of the or each said paddle or paddles is positioned a distance r from the axis and a longitudinal length of the water receiving surface of said paddle is between 0.5r and r, and wherein the method further comprises: positioning the waterwheel relative to the incoming water flow such that the incoming water flow flows onto the waterwheel at a height of between 0.5r below and 0.5r above the height of the axis.

21. The method according to claim 13 further comprising: directing the incoming water flow onto the waterwheel by way of a channel or wherein the method further comprises directing water exiting the waterwheel away from said waterwheel in a downstream direction or in a lateral direction.

* * * * *